(12) United States Patent
Goel et al.

(10) Patent No.: US 9,471,259 B2
(45) Date of Patent: Oct. 18, 2016

(54) SHARED STORAGE ARCHITECTURE

(71) Applicant: NetApp, Inc., Sunnyvale, CA (US)

(72) Inventors: Atul Goel, San Jose, CA (US); Kyle Sterling, San Francisco, CA (US); Todd Mills, Union City, CA (US)

(73) Assignee: NetApp, Inc., Sunnyvale, CA (US)

( * ) Notice: Subject to any disclaimer, the term of this patent is extended or adjusted under 35 U.S.C. 154(b) by 214 days.

(21) Appl. No.: 14/166,501

(22) Filed: Jan. 28, 2014

(65) Prior Publication Data

US 2015/0212760 A1    Jul. 30, 2015

(51) Int. Cl.
*G06F 11/00* (2006.01)
*G06F 3/06* (2006.01)
*G06F 11/20* (2006.01)

(52) U.S. Cl.
CPC ........... *G06F 3/0689* (2013.01); *G06F 3/0605* (2013.01); *G06F 3/067* (2013.01); *G06F 3/0619* (2013.01); *G06F 3/0637* (2013.01); *G06F 3/0644* (2013.01); *G06F 11/00* (2013.01); *G06F 11/2089* (2013.01); *G06F 2201/805* (2013.01); *G06F 2212/1052* (2013.01)

(58) Field of Classification Search
CPC ........... G06F 11/1425; G06F 11/2043; G06F 11/2046; G06F 11/2089; G06F 3/0619; G06F 3/0644; G06F 3/067; G06F 3/0689; G06F 2212/1044
See application file for complete search history.

(56) References Cited

U.S. PATENT DOCUMENTS

| | | | | |
|---|---|---|---|---|
| 6,336,171 | B1* | 1/2002 | Coskrey, IV | G06F 3/0619 707/999.009 |
| 6,526,432 | B1* | 2/2003 | Briskey | G06F 11/1425 709/201 |
| 7,277,952 | B2* | 10/2007 | Nishanov | G06F 9/5011 709/213 |
| 9,189,635 | B2* | 11/2015 | Hori | G06F 21/604 |
| 9,223,508 | B2* | 12/2015 | Motonaga | G06F 3/0613 |
| 2003/0065782 | A1* | 4/2003 | Nishanov | G06F 9/5011 709/226 |
| 2005/0283658 | A1* | 12/2005 | Clark | G06F 11/203 714/11 |
| 2010/0274977 | A1* | 10/2010 | Schnapp | G06F 3/0622 711/154 |
| 2012/0042202 | A1* | 2/2012 | Wenzel | H04L 41/069 714/6.3 |
| 2012/0151095 | A1* | 6/2012 | Cyr | G06F 3/0622 710/5 |
| 2013/0067191 | A1* | 3/2013 | Mehra | G06F 3/0605 711/173 |
| 2014/0229565 | A1* | 8/2014 | Das | G06F 3/0622 709/213 |
| 2016/0019001 | A1* | 1/2016 | Goodman | G06F 3/0655 711/114 |

* cited by examiner

*Primary Examiner* — Marc Duncan
(74) *Attorney, Agent, or Firm* — Nixon Peabody LLP; Khaled Shami

(57) ABSTRACT

A shared storage architecture is described for coordinating management of a shared storage between nodes of a network storage system. In various embodiments, the shared storage is partitioned into and different partitions are assigned to different nodes of the network storage system. The shared storage architecture provides techniques for asserting reservations on the shared storage, managing state of the shared storage, and implementing various configurations of the network storage system using the shared storage.

24 Claims, 15 Drawing Sheets

SHARED STORAGE ARCHITECTURE

TECHNICAL FIELD

Various of the disclosed embodiments relate to coordinating management of shared storage between nodes.

BACKGROUND

A storage system may include one or more storage devices for storing and retrieving information. A storage operating system executing on the storage system may functionally organize the storage system by, e.g., invoking storage operations in support of a storage service implemented by the storage system. The storage system may be implemented in accordance with various storage architectures including, but not limited to, a network-attached storage environment, a storage area network and/or a disk assembly directly attached to a host computer ("client").

Storage systems commonly have a storage operating system, e.g., to respond to input/output requests and/or to perform housekeeping tasks associated with the storage systems on which they operate. The storage operating system of the storage system may implement a high-level module, e.g., a file system, to logically organize the information stored on the disks as a hierarchical structure of directories, files and/or blocks. A type of file system is a write-anywhere file system. An example of a write-anywhere file system that is configured to operate on a storage system is the Write Anywhere File Layout (WAFL®) file system available from Network Appliance, Inc., of Sunnyvale, Calif.

The storage system may be managed by a plurality of computing devices, referred to herein as "nodes." In many conventional storage systems, an entire hard disk or solid state drive (SSD) is the smallest unit of capacity that could be provisioned by a node. In many systems that do not share storage devices (e.g., hard disks or SSDs), a single "owning" node generally handles the storage device that is assigned to it. In these systems, the management of the storage device is inefficient. For example, current storage systems typically require a dedicated disk to store some types data, e.g., configuration data, which may be necessary for initializing a node, parity data for redundant arrays of independent disks (RAID) etc. Some of the storage systems may even require a dedicated disk for each node. On platforms with a relatively small number of disks, for example, 14 or 24, this requirement results in a significant storage efficiency disadvantage.

In current storage architecture, a disk is typically managed by a single node, where only one node is responsible for performing input/output to the disk. In current storage architectures where a disk is shared between nodes, a centralized disk and storage state management mechanisms are employed. Further, current storage architectures do not provide a disk state management model that is robust to tolerate unreliable hardware components and resilient to failures that could otherwise greatly impact resiliency and availability in a shared disk architecture. Thus, the management of a storage device in prior storage systems having either non-shared or shared storage devices are inefficient.

BRIEF DESCRIPTION OF THE DRAWINGS

One or more embodiments of the present disclosure are illustrated by way of example and not limitation in the accompanying figures, in which like references indicate similar elements.

DETAILED DESCRIPTION

Figure 1:
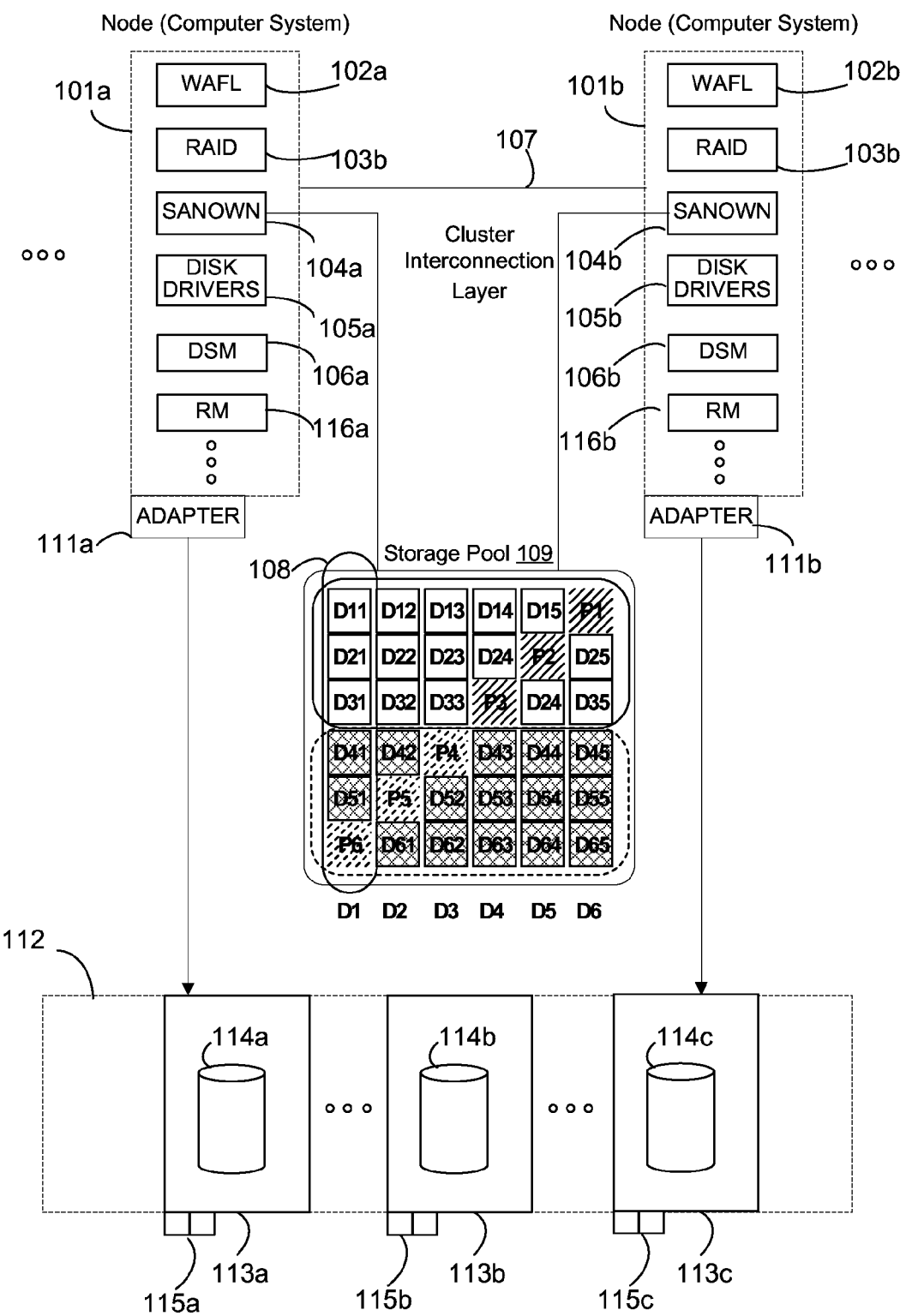
FIG. 1 is a generalized block diagram illustrating a storage system, consistent with various embodiments.

Technology is disclosed for coordinating management of shared storage between nodes in a computer storage system ("the technology"). In various embodiments, the shared storage, e.g., shared disk storage, is partitioned into multiple partitions and access to each of the partitions is provided only to a single node, referred to as an "owner" node of the partition. In the shared disk storage, different partitions can be owned by different nodes. Such a shared disk storage architecture enables fine grained provisioning of storage, for example, provisioning at a partition level. In the shared disk storage architecture, multiple nodes can simultaneously read and write to the shared disk storage. The shared storage architecture enable a cost effective implementation of various network storage configurations, including an active-passive configuration and an active-active configuration.

Some embodiments provide for reservation control protocols where one or more partner nodes take over the shared storage disk when the owner node fails. Some other embodiments provide for decentralized disk state management which enables seamless operation of the computer storage system in the event of a network partition. In the shared storage architecture, each of the nodes communicate with other nodes their own perception of a state of the shared storage disk to arrive at a combined state of the shared storage disk. The events may then be processed based on the combined stated of the shared storage disk. Embodiments of the shared storage architecture provide an ability to share a disk across nodes, while ensuring correct operation of the shared storage system in the event of node failures, takeovers, and givebacks.

Several embodiments of the described technology are described in more detail in reference to the Figures. The computing devices on which the described technology may be implemented may include one or more central processing units, memory, input devices (e.g., keyboard and pointing devices), output devices (e.g., display devices), storage devices (e.g., disk drives), and network devices (e.g., network interfaces). The memory and storage devices are computer-readable storage media that may store instructions that implement at least portions of the described technology. In addition, the data structures and message structures may be stored or transmitted via a data transmission medium, such as a signal on a communications link. Various communications links may be used, such as the Internet, a local area network, a wide area network, or a point-to-point dial-up connection. Thus, computer-readable media can comprise computer-readable storage media (e.g., "non-transitory" media) and computer-readable transmission media.

Device System Overview

Various of the disclosed embodiments concern storage device management, where the storage device (e.g., disk, non-volatile solid state memory such as flash, SSD, any storage class memory, etc.) is shared between more than one node. In shared systems, the smallest unit of capacity may be a portion of a storage device rather than a whole storage device, referred to herein as a "partition" or a "slice." It should be noted that the terms "partition" and "slice" are used interchangeably. Sharing storage devices may improve storage efficiency in low-end systems which may have a limited number of disk slots. Moreover, the cost of SSDs for low and mid-range systems may also make shared storage devices attractive. However, the sharing of storage devices between multiple nodes may complicate aspects of shared storage, e.g., disk ownership, a disk failing, disk maintenance tasks like firmware updates, recovery procedure at the nodes, etc. Although the technology is disclosed with reference to disks and or disk/drives, the technology can also be used with SSDs or other storage devices.

Accordingly, the disclosed technology coordinates disk storage management of a shared disk storage between nodes. In various embodiments, the technology partitions or slices the shared disk storage; manages the ownership of the partitions and the shared storage disk; asserts reservations on the shared storage disk; manages the state of the shared storage disk for processing events; and deploys the shared disk storage architecture in various network storage configurations.

FIG. 1 is a generalized block diagram illustrating a storage system, consistent with various embodiments. In the illustrated embodiments, nodes 101a-b may be computer systems configured to manage a plurality of storage devices 114a-c. Although FIG. 1 illustrates two nodes, the technology can function with more nodes. Within each node 101a-b may be multiple interacting control layers or "modules." For example, a file control system, e.g., WAFL 102a-b, a redundant array of independent disks (RAID) configuration management systems 103a-b, a software-based disk ownership (SANOWN) module 104a-b, and disk drivers 105a-b, may interact during management of one or more of the storage devices 114a-c.

A cluster interconnection layer 107 can facilitate interaction and communication between nodes 101a-b. For example, the layer 107 may be a direct or a networked connection, e.g., an Ethernet connection between the nodes 101a-b and may be used to synchronize information between the nodes. Each node may also be in communication with a storage pool 109 having a number of container disks, e.g., container disk 108. The container disk 108 is a type of shared storage which is partitioned into a plurality of partitions and different partitions are associated with different nodes. In some embodiments, an administrator, e.g., an administrator of the storage system 100, can configure the partitions of the container disk 108. In FIG. 1, each of the container disks D1-D6 is partitioned into six partitions. For example, the disk "D1" is partitioned into partitions D11-D51 and P6. The other disks D2-D6 are partitioned similarly. An access (read access or write access) to a particular partition is provided only to the node the particular partition is associated with, referred to as the owner node.

Each of the partitions "D11" to "D65" and "P1" to "P6", may contain data indicating respective ownership information. For example, if node 101a manages partitions "D11"-"D15", the partitions "D11"-"D15" can include ownership information identifying node 101a. Similarly, if node 101b manages partitions "D41" to "D45," the partitions "D41"-"D45" can include ownership information identifying node 101b. In some embodiments, the SANOWN layer 104a-b manages the ownership at the granularity of container disk 108. In various embodiments, the owner of a container disk 108 may not automatically get write access to all blocks on the container disk. Instead, the owner of the container disk 108 is configured to perform maintenance operations such as firmware download on the container disk 108. In some embodiments, an administrator of the storage system 100 can configure the roles and responsibilities of the owner node of the container disk 108.

The storage system 100 can include a combination of a partitioned storage device (which is also known as container disk) and a non-partitioned storage device. For example, storage devices 114a-c can be a combination of partitioned and non-partitioned storage devices. It should be noted that, unlike a partitioned storage device, a non-partitioned storage device may not be shared between multiple nodes at the same time.

The nodes 101a-b include disk state management modules (DSMs) 106a-b that facilitate deriving a common state of the container disk 108 based on the state of the container disk 108 stored at each of the nodes. In some embodiments, each of the nodes store their own perception of the state of the container disk 108. The "DSMs" 106a-b may be used to store state information of the container disk 108 so that operations may be completed following a system failure.

The nodes 101a-b also include reservation modules (RM) 116a-b that facilitate asserting a reservation on the container disk 108 when an owner node of a particular partition is failing. For example, when node 101a is failing, the RM 116b of the node 101b asserts a reservation (e.g., write exclusive) on the container disk 108. In various embodiments, asserting a reservation can ensure that the failing node cannot write to the partitions it previously owned on the container disk 108. After asserting a reservation, all the partitions that were associated with node 101a are then associated with node 101b. Therefore, the node 101b would now have exclusive write access to the container disk 108. In embodiments having more than two nodes, when a particular node is failing, one of the nodes revokes the registration of the failing container disk 108.

The nodes 101*a-b* may communicate with one or more storage devices 114*a-c* via adapters 111*a-b*. Storage devices 114*a-c* may be any storage system capable of storing data, e.g., hard drive disks, solid state drives (SSDs), etc. The storage devices 114*a-c* may be organized into logical units (LUNs). Each storage device 114*a-c* may be housed in a respective storage bay 113*a-c* that may themselves be housed in a storage rack 112. The storage bays 113*a-c* or the storage devices 114*a-c* themselves may include indicators 115*a-c*, e.g., light emitting diodes (LEDs), to indicate the state of the storage device 114*a-c*. For example, if the storage device 114*a* is in a failed state, then the indicator 115*a* may flash red, or, if a firmware is being downloaded to the storage device then it might indicate a different color.

Device failure handling may involve various software components within some of the disclosed embodiments. The software components may include a Storage Disk Layer (disk) configured for all interactions between software components and random-access devices (e.g., hard disks and SSDs) associated with a clustered storage operating system, e.g., Clustered Data ONTAP®. A clustered storage operating system enable clustering of storage-related components (e.g., storage devices) to enhance scalability and increase availability. The software components may also include a Storage Partition Module implemented as a component of the storage disk layer configured to logically represent a physical device and its storage capacity as container disk with its storage capacity divided into logical partitions. The software components may include a "SANOWN" configured to manage a disk ownership module (e.g., to decide which node has write access to a disk or a partition), e.g., SANOWN modules 104*a-b*.

A redundant array of independent disks (RAID) configuration, e.g., a RAID configuration 103*a-b*, configured to handle disk failures by performing a sick disk copy ("SDC") or reconstructing data to a replacement disk from the remaining members of a redundant RAID group. In some embodiments, RAID configuration 103*a-b* can be responsible for one or more of a) managing the configuration of storage pool 109 and aggregates in the storage pool, b) managing the state of container disks, c) reconciling different states of container disk as maintained on each node, d) handling errors such as disk failures, e) coordinating disk firmware updates, etc.

A software monitor, e.g., RAID Level Migration associated with RAID configuration 103*a-b*, may be responsible for monitoring the health of disks from the perspective of both nodes, and making RAID layout decisions when a disk fails non-persistently from one node, but not the other. The disk, SANOWN, and RAID layers may independently detect disk failures and may initiate disk failure handling.

Storage Pool

Figure 2:
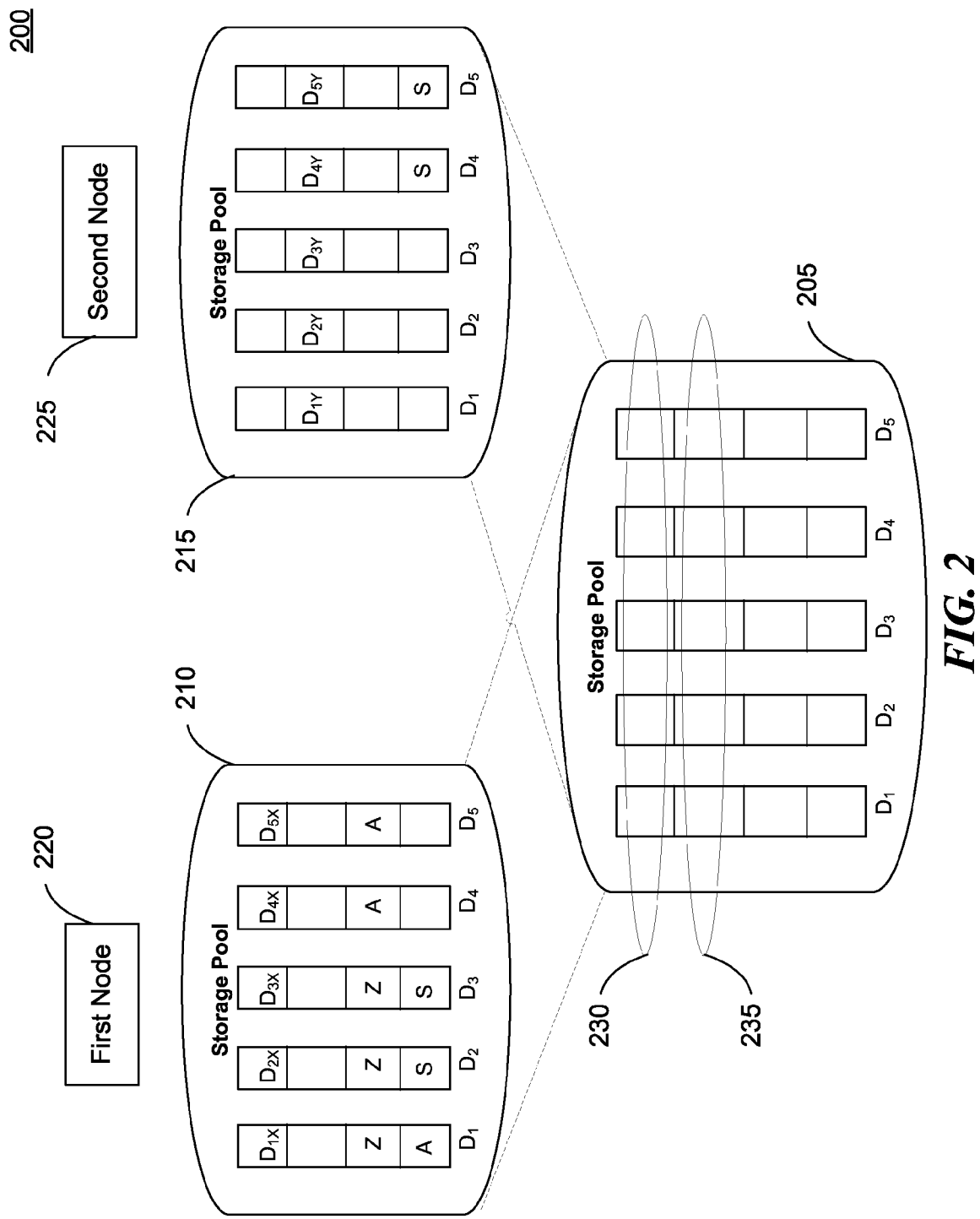
FIG. 2 is a block diagram illustrating a storage pool shared between two nodes, consistent with various embodiments.

FIG. 2 is a block diagram illustrating a storage pool shared between two nodes, consistent with various embodiments. In various embodiments, the storage pool 205 is similar to the storage pool 109 of FIG. 1, and the first and second nodes 220 and 225 are similar to the nodes 101*a-b*. The storage pool 205 is a collection of container disks D1-D5. Each of the container disks can be partitioned into a number of partitions or slices. Each of the nodes 220 and 225 maintains an instance of the storage pool 205 in their corresponding memories. For example, the first node 220 creates a first storage pool instance 210 (also referred to as "first node's storage pool instance 210") of the storage pool 205 and the second node 225 creates a second storage pool instance 215 (also referred to as "second node's storage pool instance 215") of the storage pool 205. In some embodiments, an instance of a storage pool is a logical representation of the storage pool 205 by a particular node. In various embodiments, the nodes, first node 220 and second node 225 track or maintain the states of the container disks and the partitions in their corresponding storage pool instances.

The container disks can be divided into a number of aggregates a higher level logical storage object provisioned by an administrator, e.g., administrator of storage system 100. Each of the aggregates can have a number of partitions from different disks. For example, an aggregate X having partitions $D_{1X}$, $D_{2X}$, $D_{3X}$, $P_{1X}$ and $P_{2X}$ from disks D1-D5, respectively, can be formed using partitions 230 from the storage pool 205. An aggregate can be assigned to a particular node. For example, aggregate X can be assigned to first node 220. The allocation of partitions 230, e.g., as partitions $D_{1X}$, $D_{2X}$, $D_{3X}$, $P_{1X}$ and $P_{2X}$, to aggregate X is recorded in the first node's storage pool instance 210 as illustrated. After a partition is allocated to an aggregate, it may not be used by or allocated to another aggregate. That is, a partition can only belong to a single aggregate. Further, in various embodiments, an aggregate can be owned by only one node. However, different aggregates can be owned by different nodes, and different aggregates can have different number of partitions.

After the partitions 230 are allocated to aggregate X, they are not available for allocation to second node 225. A different set of partitions, partitions 235, may be assigned to the second node 225. For example, an aggregate Y can be formed using partitions $D_{1Y}$, $D_{2Y}$, $D_{3Y}$, $D_{4Y}$ and $P_{1Y}$ from disks D1-D5, respectively, and assigned to the second node 225. The allocation of partitions 235 to aggregate Y is recorded in the second node's storage pool instance 215 as illustrated.

In various embodiments, an aggregate can implement a RAID architecture. For example, aggregate X implements RAID-DP architecture having three data partitions and two parity partitions. Further, different aggregates can implement different RAID level architectures and different stripe widths (e.g., number of partitions or disks in a RAID group). For example, while aggregate X implements RAID-DP, aggregate Y implements RAID 4 architecture. In various embodiments, a RAID group may be required to have partitions from different disks.

The container disks can have spare partitions, e.g., partitions "S" as illustrated. The spare partitions, like other partitions, can be assigned to any of the nodes. However, unlike the other partitions, the spare partitions are individual partitions and may not belong to or be part of an aggregate. Further, a spare partition that is owned by one node cannot be assigned to another node.

Container Disk Partition Examples

Figure 3:
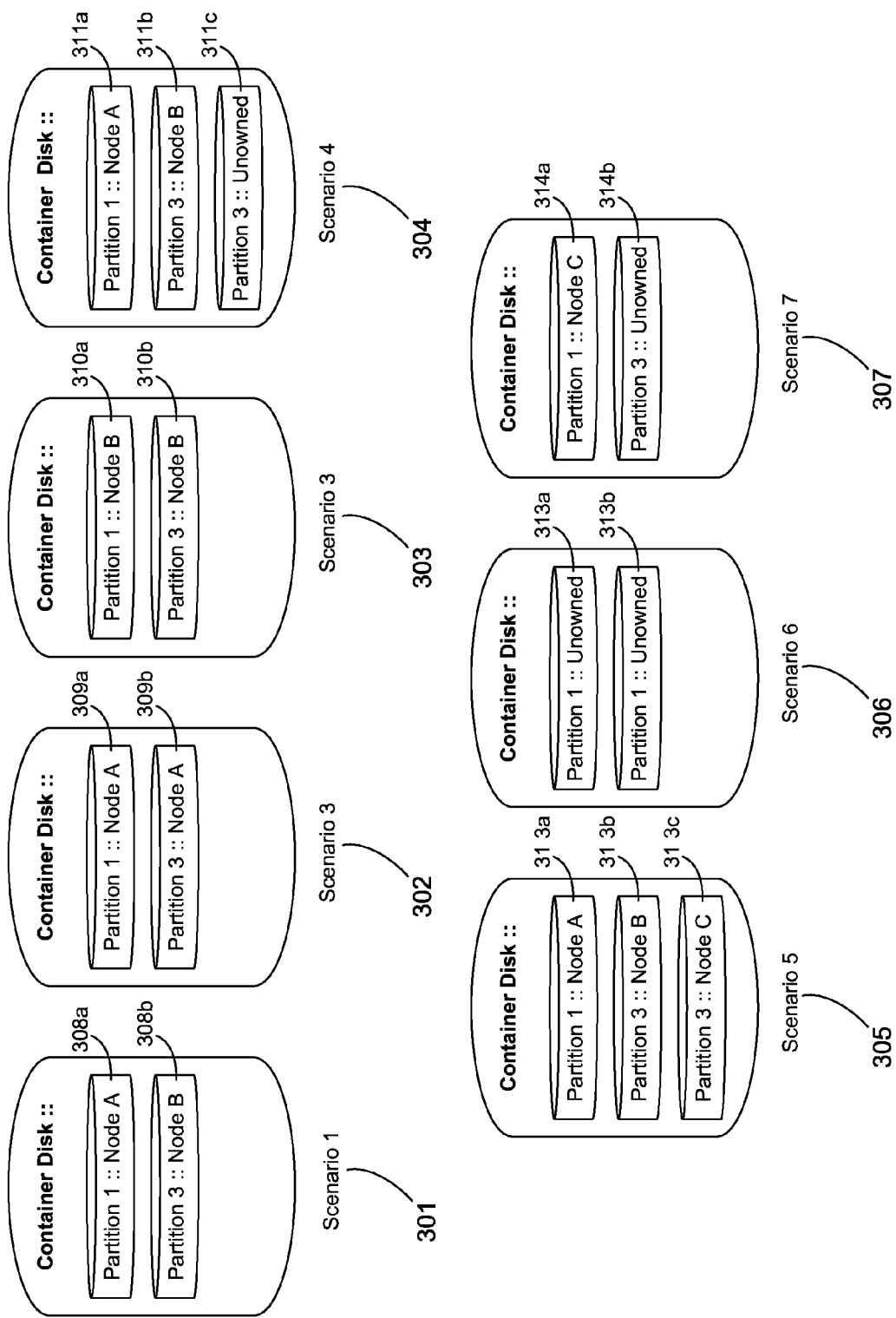
FIG. 3 is a block diagram illustrating various examples of container disk partition assignments to nodes, consistent with various embodiments.

FIG. 3 is a block diagram illustrating various examples of container disk partition assignments to nodes consistent with various embodiments. In Scenario 1, container disk 301 has a first partition 308*a* managed by Node A and a second partition 308*b* managed by Node B. In Scenario 2, the container disk 302 has a first partition 309*a* managed by Node A and a second partition 309*b* also managed by Node A. In Scenario 3, the container disk 303 has a first partition 310*a* managed by Node B and a second partition 310*b* managed by Node B.

In Scenario 4, the container disk 304 has a first partition 311*a* managed by Node A, a second partition 311*b* managed by Node B, and a third partition 311c which is not managed. In Scenario 5, the container disk 305 has a first partition 312a managed by Node A, a second partition 312b managed by Node B, and a third partition 312c managed by Node C.

In Scenario 6, the container disk 306 managed by Node A has a first partition 313a which is not managed and a second partition 313b which is not managed. In Scenario 7, the container disk 307 managed by Node A has a first partition 314a managed by Node C and a second partition 314b which is not managed.

One will readily recognize additional partition configurations addressed by the embodiments discussed in greater detail herein. Further, it should be noted throughout the specification that a statement such as—a partition is "managed by," "associated with," "assigned to," or "owned by" a particular node mean that a read/write access to the particular partition can be (or is) restricted to the particular node.

Logical Zoning Structure of Storage Devices

Figure 4:
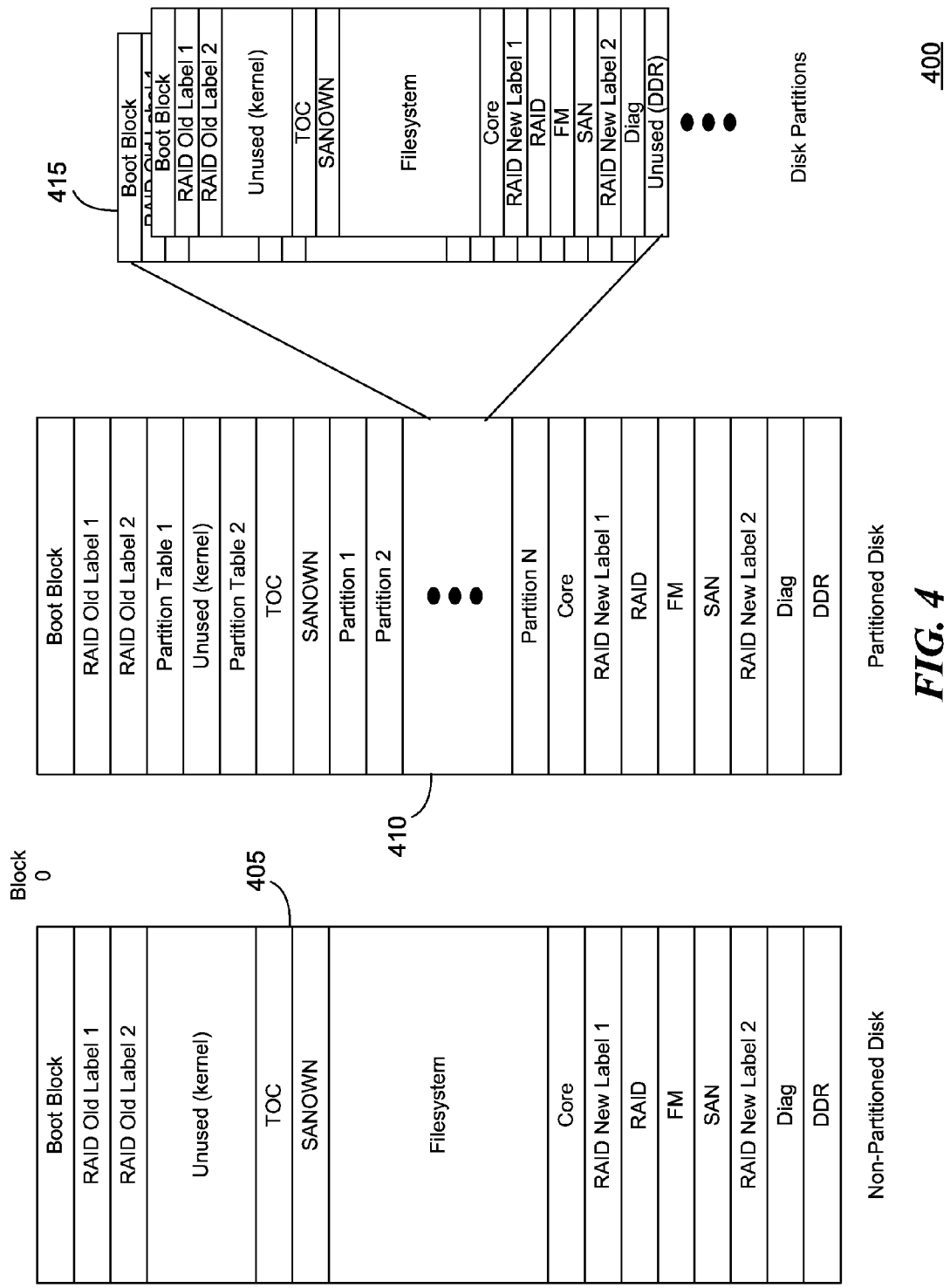
FIG. 4 is a layout diagram illustrating logical zoning structures of a non-partitioned storage device, consistent with various embodiments.

FIG. 4 is a layout diagram illustrating logical zoning structures of a storage device, consistent with various embodiments. In an embodiment, the logical zoning structure of a storage device includes information regarding the organization of various types of data in the storage device. For example, the logical zoning structure 405 of a non-partitioned disk includes a plurality of layers, e.g., "RAID Old Label 1," "RAID Old Label 2," . . . "SANOWN," "Filesystem" . . . "DDR" etc.

In some embodiments, RAID Old Label1, RAID old label 2, RAID New Label 1, and RAID New Label 2 store RAID-specific metadata and configuration information that may be necessary to keep track of the state of container disks, and to create an aggregate. The SANOWN can store information about the node which currently owns the disk or the partition. The Filesystem zone can be used to store the Filesystem image. In various embodiments, the "Filesystem" is the zone of the storage device in which user data from a client of the storage system may be stored. In some embodiments, the Filesystem zone may be the only zone visible to WAFL.

TOC (Table Of Contents) can describe the size and the placement of the other zones on the disk. Core can refer to the zone which is used to save code if a node is not functioning normally. RAID zone may be used to store non-critical metadata. DDR zone may store vital disk parameters such as its usable size and checksum type.

The logical zoning structure 410 of a partitioned storage device is similar to that of the non-partitioned storage device, except for some layers, e.g., "Partition Table 1," "Partition Table 2" and Partitions 1–N. The partitioned storage device can be almost any storage device, e.g., container disk 108 of FIG. 1. The "Partitions 1–N" are the partitions into which the storage device is partitioned. In some embodiments, the non-partitioned storage device can be partitioned to form a partitioned storage device by partitioning the "Filesystem" zone of the non-partitioned storage device into one or more partitions, e.g., "Partitions 1–N." In some embodiments, partitioning of the storage device may be done by one or more nodes, e.g., nodes 101a-b of FIG. 1. A node may also assign the one or more partitions to itself and/or other nodes.

The logical zoning structure 415 of a partition of the partitioned storage device can be identical to that of a non-partitioned storage device. In some embodiments, since the logical zoning structure 415 of a partition is identical to that of the non-partitioned storage device, a node views the partition as an independent storage device. This allows for configuring the nodes of the current storage systems to use the partitions with minimum changes to the source code.

The logical zoning structures 405, 410 and 415 includes the "SANOWN" zone which, in some embodiments, identifies the owner node of the storage device/partition. Although, the "SANOWN" zone in the three examples identify the owner node, the owner node in each of the above cases can have different responsibilities. For example, the owner node of the non-partitioned storage device can have complete access including, reading, writing, performing maintenance tasks e.g., firmware upgrade, spasm handling, reservations etc. on the storage device.

However, the owner node of the partitioned storage device has limited access to the storage device compared to the owner node of the non-partitioned storage device. The owner node of the partitioned storage device may not read from or write to partitions. However, the owner node may perform storage device level tasks e.g., maintenance tasks, including firmware upgrades, spasm handling, reservations, setting failure bytes, changing LED state, etc. Since the owner node of the partitioned storage device can perform most of the maintenance tasks, the owner node is also referred to as a "master node." The master node can be the sole authority for updating metadata zones on the partitioned storage device. Further, the master node can act as the coordinator to help serialize ownership change requests for unassigned partitions. The master node also performs other tasks, including dispatching AutoSupport alerts for important state transitions like disk failure. In an embodiment, AutoSupport alerts are sent when potential system problems are detected. AutoSupport messages are automatically analyzed and flagged for appropriate corrective action, which can often be taken without user or administrator involvement.

The owner node of a partition can be the node that is authorized to read from or write to the partitions. However, the owner node of the partition cannot perform storage device level tasks, e.g., because the partition is shared with other nodes.

In some embodiments, ownership of a partition is managed independent of the ownership of the partitioned storage device. It is possible to have a configuration where a node A is a master node of a partitioned storage device in which all partitions are owned by another node, Node B. However, a partitioned storage device may have need to a master node assigned to it before its partitions are usable by RAID. The notion of the master node is more fungible compared to the notion of an owner node. Accordingly, it is possible to switch the master node of a partitioned storage device to another node while the partitions are being actively used for data access.

Figure 5:
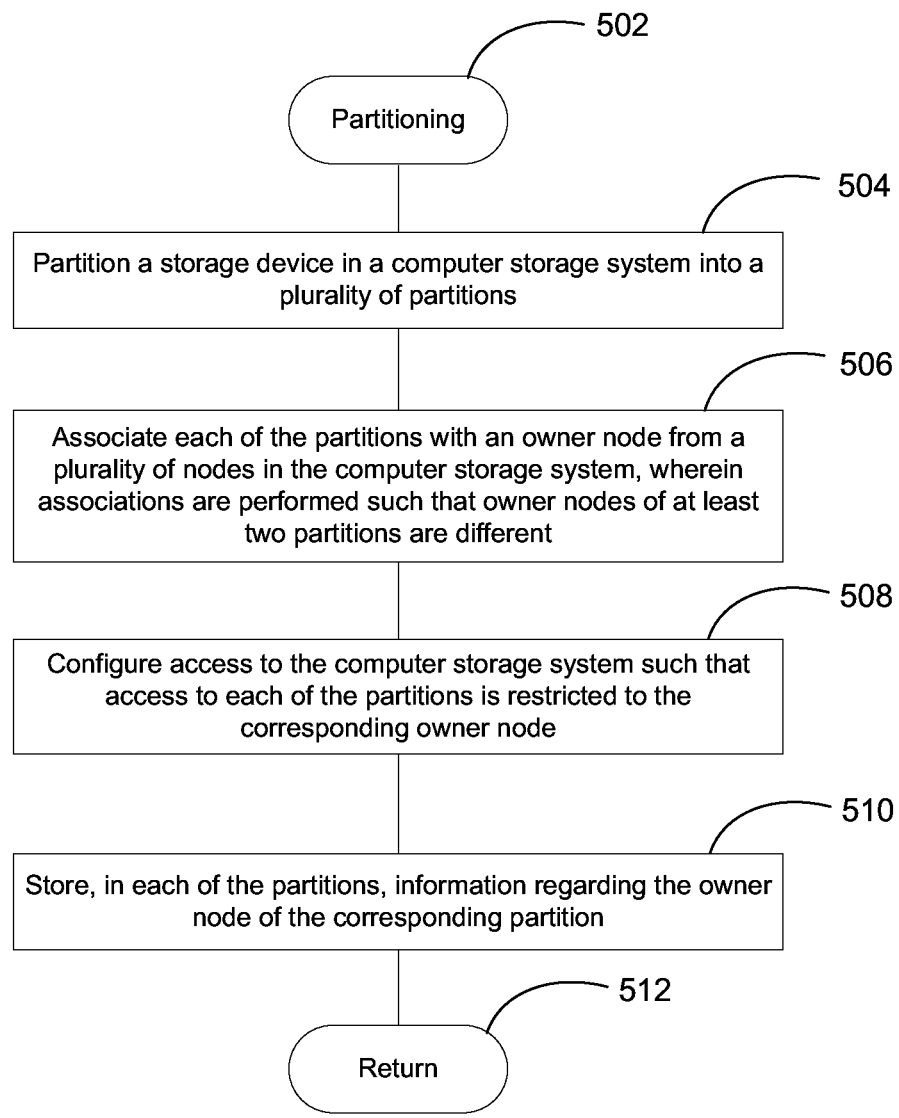
FIG. 5 is a flow diagram illustrating a process for partitioning a storage device in a shared storage system, consistent with various embodiments.

FIG. 5 is a flow diagram illustrating a process 500 for partitioning a storage device in a shared storage system, according to an embodiment of the disclosed technique, consistent with various embodiments. In some embodiments, the process of partitioning may be performed by an administrator, e.g., administrator of storage system 100. The process begins at block 502. At block 504, a storage device is partitioned into several partitions. At block 506, the partitions are associated with an owner node. The associations are performed in such a way that the storage device is shared across multiple nodes. In some embodiments, at least two different partitions are associated with two or more different owner nodes. At block 508, the shared storage system is configured such that the access to each of the partitions is restricted to their corresponding owner nodes.

At block 510, information regarding the owner node of a partition is stored in the corresponding partitions. At block 512, the process returns.

Those skilled in the art will appreciate that the logic illustrated in FIG. 5 and described above, and in each of the flow diagrams discussed below, may be altered in various ways. For example, the order of the logic may be rearranged, substeps may be performed in parallel, illustrated logic may be omitted, other logic may be included, etc.

Reservation and Fencing

Reservation is a process where a partner node performs a "takeover" of a partitioned storage device when an owner node of a particular partition in the partitioned storage device is failing. More specifically, during a takeover, the partner node asserts write-exclusive reservation (also referred to as "write exclusive access") on the partitioned storage device.

Figure 6:
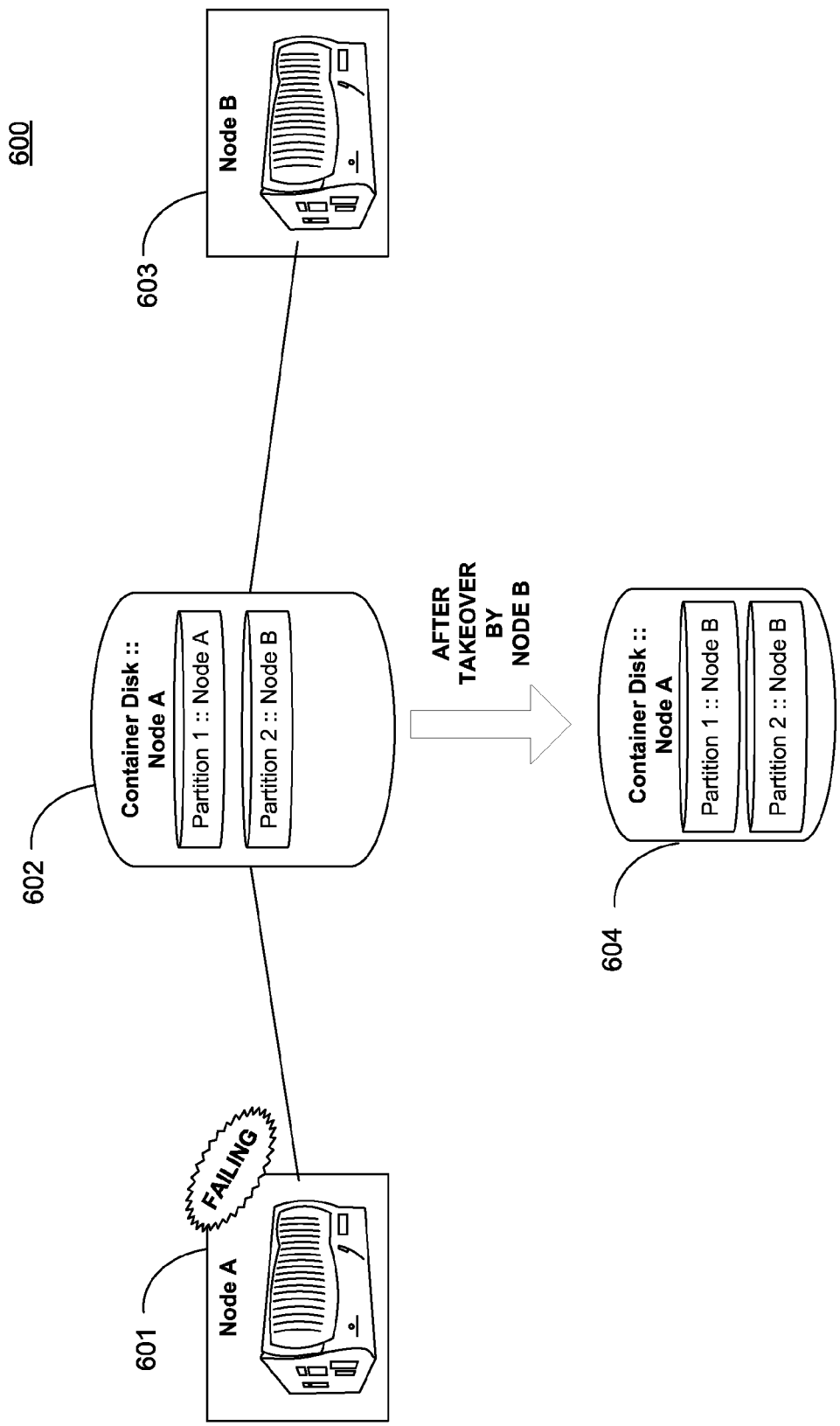
FIG. 6 is a block diagram illustrating a scenario for asserting reservations in a shared storage system, consistent with various embodiments.

FIG. 6 is a block diagram illustrating a scenario 600 for asserting reservations in a shared storage system, consistent with various embodiments. In the illustrated embodiment, a container disk 602 (e.g., similar to the container disk 108 of FIG. 1) includes two partitions, "partition 1" assigned to Node A 601 and "partition 2" assigned to Node B 603. The nodes 601 and 603 can be similar to the nodes 101*a-b* of FIG. 1.

The reservation process encompasses three different modes as follows:

- Normal mode—a mode where none of the nodes are erroneous—No reservations are asserted on the container disk 602 (e.g., after an initial identification). This enables Node A 601 and Node B 603 to simultaneously write to their respective partitions on the container disk 602.
- Takeover mode—a mode when one of the nodes is failing or failed—Write-exclusive reservations are asserted by a partner node. For example, if Node A 601 is failing, then the partner node, Node B 603 performs a "takeover," that is, asserts write exclusive access to the container disk 602. After the takeover, all the partitions that were associated with Node A 601 would then be associated with Node B 603 as shown in container disk 604.
- Giveback mode—a mode when the owner node is back up and running—Reservations on the container disk 604 are released by the partner node. For example, when the Node A 601 is back up and running, Node B 603 may "giveback" the reservation. As a result the Node A 601 will get back its partitions and revert to the representation in Node A 602.

Referring back to the takeover mode, during takeover, the partner node, Node B 602, ensures that any current write operation by the failing node, Node A 601 is stopped from completing successfully. In some embodiments, Node B 602 fences the partitions that belonged to Node A 601 from Node A 601 to avoid any current write operations from Node A 601 from being completed.

In some embodiments, a storage layer, e.g., RM 116*a-b* of FIG. 1, on each node may perform fencing at a software level as follows: The SANOWN layer in a node notifies the RM with information on which partitions are writable by the node. These notifications may be issued during events, e.g., takeover, giveback, and ownership changes. The RM on each node may use these notifications to build a "fence mask" that identifies which partitions can be written to by that node. For every write operation, the RM checks if the node is indeed authorized to perform write operations on the relevant partition. If the node is not permitted to perform the write operation, the RM fails the write operation with a reservation conflict error.

Figure 7:
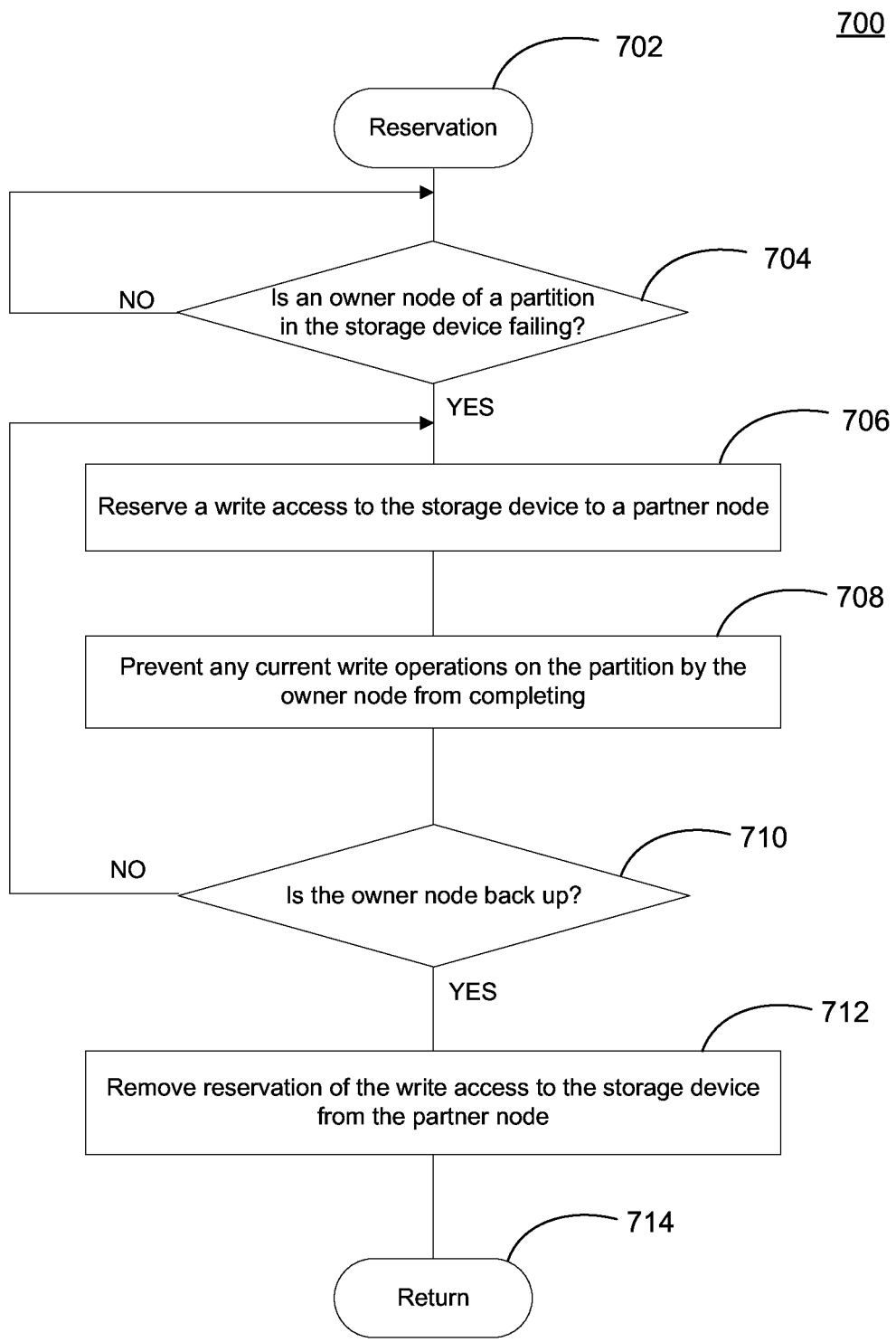
FIG. 7 is a flow diagram illustrating a process for asserting reservations in a shared storage system, consistent with various embodiments.

FIG. 7 is a flow diagram illustrating a process 700 for asserting reservations in a shared storage system, consistent with various embodiments. The process begins at block 702. At decision block 704, a partner node determines whether an owner node of a particular partition of a container disk is failing. Responsive to a determination that the owner node is failing, block 706, the partner node performs a takeover operation by reserving a write access to the container disk. Otherwise, the process waits.

At step 708, the container disk prevents any write operations by the failing node on the partition from being completed successfully. At decision block 710, the partner node determines if the owner node is back up and running. Responsive to a determination that the owner node is not back up, the partner node continues to reserve the write access to the container disk and returns to block 706. On the other hand, responsive to a determination that the owner node is back up, at block 712, the partner node performs a giveback operation by releasing the reservation. The write-exclusive access from the partner node is removed and the partitions that belonged to the owner node prior to takeover are assigned back to the owner node. The process returns at block 714.

Disk State Management

Since the container disk can be shared across nodes, any task or process that is performed on the entire disk is coordinated across the nodes. Coordination of tasks can be done using state management. In the embodiments, the shared storage architecture uses multiple configuration views with eventual single system model for managing a state of the shared storage device, e.g., as the container disk 108 of FIG. 1. In this model, each of the nodes in the shared storage system maintains its own view of a state of the container disk, hence the name "multiple configuration views." However, the shared storage system eventually reconciles the state of the disk from all the nodes (hence, referred to as "eventual single system model") to form a single common state of the container disk across all the nodes.

In the above state management architecture, the container disk can fail on a per node basis, that is, failure detection and recovery processes can be performed independently on each node. However, the nodes may not coordinate with each other during reading or writing data into corresponding partitions of the container disk. In some embodiments, each node commits failures of the partitions it owns and its instance of the container disk independent of the other nodes. Each node can also initiate reconstruction or sick disk copy operations on affected partitions independently. During sick disk copy, storage devices that are failing can be taken offline after copying their contents to a healthy storage device.

In the eventual single system image model, a container disk failure on one node eventually results in either moving data from partitions owned by other nodes, or repairing the container disk to a good state. For persistent fatal errors (e.g., errors that prevent further use and future use of the device) this can be done by triggering sick disk copies on partitions owned by the other node. Once all the partitions have failed, maintenance center testing can be started. For non-persistent fatal errors (e.g., errors that prevent further use of the device until the error is corrected by a system administrator), depending upon the number of container disks that have failed on a node, either the container disk is evacuated via sick disk copy, or it is repaired back.

Similar to failure processing, spasm handing can also happen on a per-node basis. In some embodiments, disk spasm is a condition during which a container disk takes an unusually long time to respond to a read/write operation by a node—so long that the node may time-out. The spasm handling also happens on a per node basis because a storage error escalation algorithm, which typically works on a per node basis, assists in determining whether or not the container disk has a spasm condition. Since the spasm recovery process is relatively fast, the container disk would not take a long time to converge to a single common state.

Some operations that change the state of a physical disk can apply to the whole container disk. Examples of these operations include, e.g., marking a disk as "sick" or initiating a replacement disk operation. However, because the disclosed technology implements these operations at the level of partitions, these operations can be made persistent to ensure that crashes and reboots do not lead to a condition where the container disk as a whole cannot converge to a single common state.

In a multiple-configuration-view model, the state of a container disk as presented to users reflects a summary of the states seen by various nodes in the system. At a node level, the state of a disk can differ between nodes. In an embodiment, the states from each node are shared across the other nodes. When a node receives an event from a partner node, the node maps the event to a state and stores a mapping table at the node. The mappings of the events to states at each of the nodes enables the shared storage system to derive a single common state of the container disk.

The following is table for determining a combined state of a container disk based on the individual states of the container disk maintained at each of the nodes in a two node configuration storage system, e.g., storage system 100 of FIG. 1.

TABLE 1

Combined State of a Disk

| DISK STATE | Present | Pre-Failing | Failed | Unfailing | Missing | Offline |
|---|---|---|---|---|---|---|
| Present | Present | Pre-Failing | Failed | Present | Divided | Divided |
| Pre-Failing | Pre-Failing | Pre-Failing | Failed | Unfailing | Pre-Failing | Pre-Failing |
| Failed | Failed | Failed | Failed | Unfailing | Failed | Failed |
| Unfailing | Present | Unfailing | Unfailing | Unfailing | Divided | Divided |
| Missing | Divided | Pre-Failing | Failed | Divided | Missing | Divided |
| Offline | Divided | Pre-Failing | Failed | Divided | Divided | Offline |

In various embodiments, the states of a container disk can include present, pre-failing, failed, unfailing, missing and offline. The state present can indicate that the disk is in a healthy state, working as it should, or in a good condition. The state pre-failing can indicate that the container disk is in the process of failing, but not yet failed. In some embodiments, the pre-failing state can be an intermediate state in the process of failing a disk and it can continue to be the state until, for example, contents of the disk are backed up to another, which could take hours or days. The disk can be transitioned to a failed state after the back-up operation is completed.

The state failed can indicate that the disk has failed from the perspective of a particular node. The state unfailing can indicate that the disk is in the process of recovering from a failure, or is unfailing. It is a state where a disk was marked failed by at least one of the nodes and now is in the process of being un-failed. In various embodiments, the state can be changed from failed to unfailing typically when an assumption is made that the disk is working normally.

The state missing can indicate that the container disk is missing, e.g., not accessible or not reachable. The state offline can indicate that disk is offline or inactive. The state offline is a transient state which can last for a short duration, e.g., a couple of minutes or so, and can be used to execute operations, e.g., quick recovery operations on a disk.

In various embodiments, the states pre-failing, unfailing, missing and offline are intermediate or transient states that eventually would lead to one of the other states. The state divided is also an intermediate state, but an eventual state will have to be further determined. Determining a resulting state from the divided state is described with reference to FIG. 8.

As explained above, in various embodiments, each of the nodes maintains its own perspective of a state of the disk. A combined, derived, reconciled or a summary state of the container disk, can be determined by obtaining the state of the disk from the nodes 101*a-b* and referring table 1.

For example, if the state of the disk as perceived by a first node, e.g., node 101*a*, is "present," and the state of the disk as perceived by a second node, e.g., node 101*b*, is also "present," then, from table 1, the summary state of the disk is "present." This can imply that the disk is operating normally. No recovery actions may have to be performed. Typically, under normal working conditions of the storage system 100, the disk would be in "present" state. In another example, if one node, node 101*a*, considers the disk being in "pre-failing" state and the other node, node 101*b*, considers the disk being in "present" state, then the summary state, according to table 1, is "pre-failing." In various embodiments, each of the above states is associated with an operation that has to be performed on the disk. For example, the unfailing state may be associated with a set of operations, e.g., updating partition or aggregate assignments, that may have to be performed before the disk is brought into present state from the unfailing state. In various embodiments, the RAID subsystem 103*b* may perform these set of operations. Accordingly, table 1 can be used to determine the summary state of the disk, which can be used for determining the set of operations that may have to be performed on the disk.

In various embodiments, the summary state is determined by a state computing system (not illustrated) that works in association with the storage system 100. The state computing system can obtain the individual states of the disk from the nodes 101*a-b* via the DSMs 106*a-b*.

Figure 8:
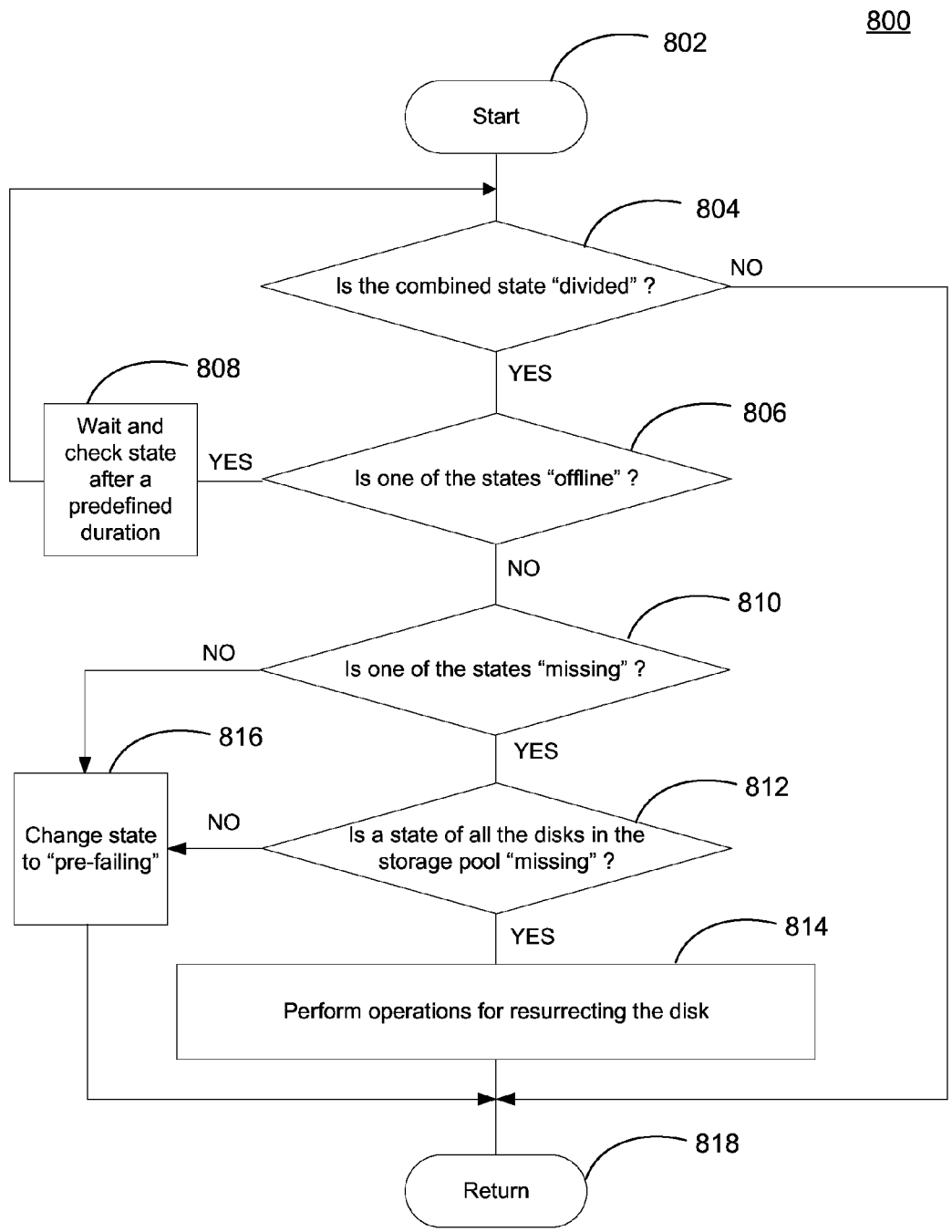
FIG. 8 is a flow diagram illustrating a process for determining an eventual state of a disk from a "divided" state, consistent with various embodiments.

FIG. 8 is a flow diagram illustrating a process for determining an eventual state of a disk which is in a "divided" state, consistent with various embodiments. The process 800 may execute in a shared storage system, e.g., the shared storage system 100 of FIG. 1 and begins at block 802. At block 804, a state computing system (not illustrated) that works in association with the storage system 100, determines whether the combined state of the disk is "divided." Responsive to a determination that the combined state is not "divided," the process returns at block 818. On the other hand, responsive to a determination that the state is "divided," at block 806, the state computing system determines if one of the individual states is "offline."

Responsive to a determination that one of the states is "offline," at block 808, the state computing system continues checking the state at regular intervals and the control is transferred to step 804. In various embodiments, the state computing system continues rechecking the state since the storage system 100 may not have enough information to determine what the eventual state can be. However, since the "offline" state is a transient state, the state of the disk may change in a while.

Referring back to block 806, if the state computing system determines that none of the nodes see the disk as "offline," at block 810, the state computing system determines if one of the individual states is "missing." Responsive to a determination that the state of the disk is not "missing" from any of the nodes, at block 816, the state computing system changes the state of the disk to "pre-failing" state and returns at block 818. On the other hand, responsive to a determination that the state of disk from one of the nodes is "missing," at block 812, the state computing system determines if other disks in the storage pool 109 are also in "missing" state.

Responsive to a determination that the other disks are not in "missing" state, at block 816, the state computing system determines that state of the disk as "pre-failing," and the process returns at block 818. On the other hand, responsive to a determination that the other disks are also in "missing" state, at block 814, the state computing system works in association with the storage system 100 to perform operations for resurrecting the missing disks, and returns at block 818.

In various embodiments, if multiple disks in the storage pool 109 are in "missing" state, then it is likely that the problem is not because of or restricted to the particular disk. The problem may be in the shelf or the rack housing the disks of the storage pool 109. In some embodiments, this scenario may occur when a disk is pulled out from the rack or shelf.

Figure 9:
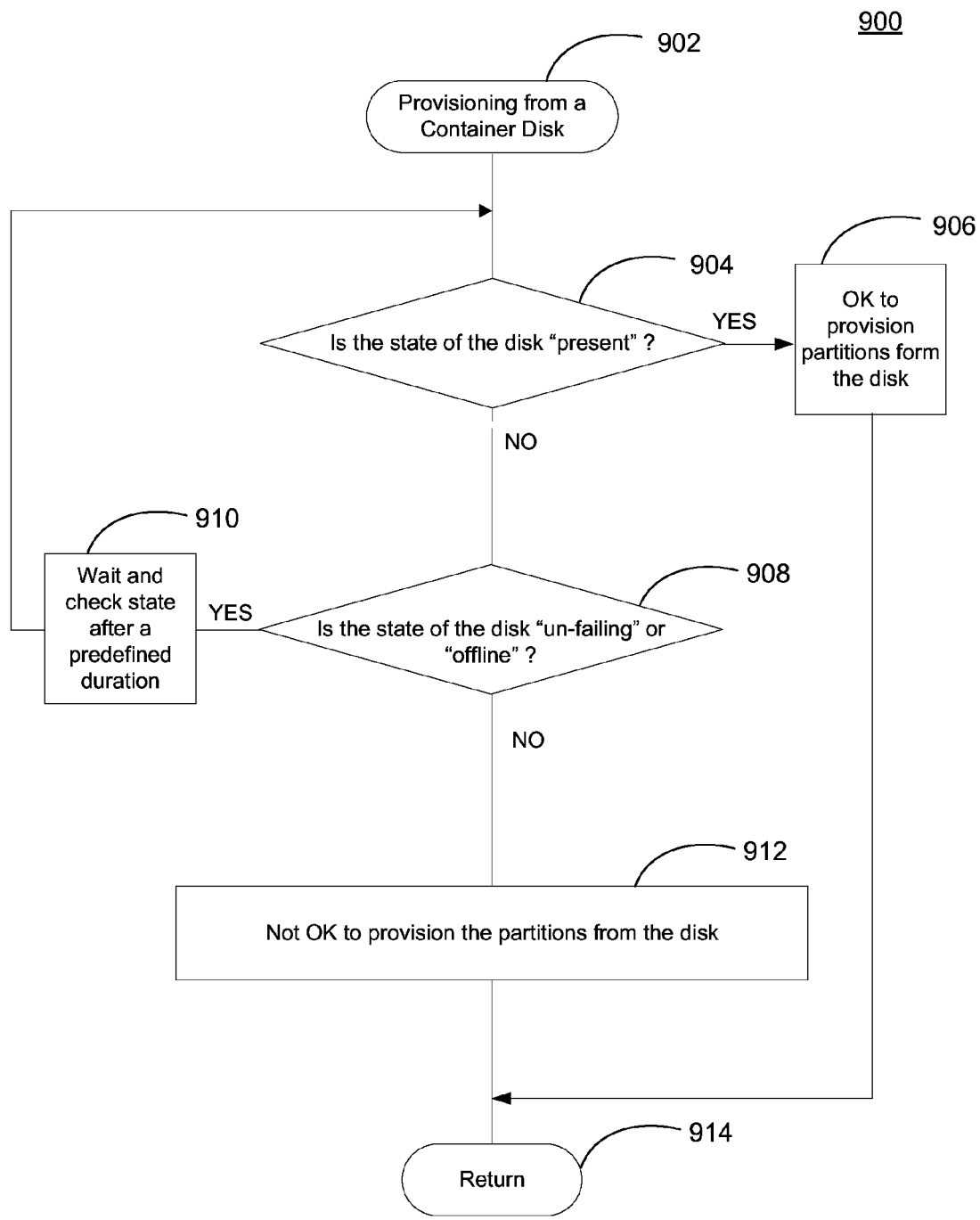
FIG. 9 is a flow diagram illustrating a process of using a table of combined states of a container disk in provisioning of partitions from the disk to an aggregate, consistent with various embodiments.

FIG. 9 is a flow diagram illustrating a process 900 of using a table of combined states of a container disk in provisioning of partitions from the disk to an aggregate, consistent with various embodiments. The process 900 may execute in a shared storage system, e.g., the shared storage system 100 of FIG. 1 and begins at block 902. In various embodiments, the state (e.g., combined state) of a particular disk plays a significant role in deciding whether to provision partitions from the particular disk to an aggregate or create a new aggregate from the partitions.

At block 904, the storage system 100 determines if the state of a particular disk is "present." In various embodiments, the combined state of the disk is determined using a table of combined states, e.g., Table 1 depicted above. In some embodiments, the "present" state can mean that both nodes 101*a-b* can communicate with the particular disk normally. Responsive to a determination that the combined state of the disk is "present," at block 906, the storage system 100 determines that it is ok to provision the partitions from the disk to an aggregate, and the process returns at block 914.

On the other hand, responsive to a determination that the combined state is not "present," at block 908, the storage system 100 determines whether the combined state is "un-failing" or "offline." Responsive to a determination that the combined state is "un-failing" or "offline", the storage system 100 waits and continues to check the state at regular intervals. In various embodiments, the states "un-failing" or "offline" are transient states, and therefore may eventually change to another state. For example, the states "un-failing" or "offline" can be states that are used to perform certain actions and these actions execute or can be performed in a relatively short span of time, e.g., in the order of tenths of seconds to a few minutes.

On the other hand, responsive to a determination that the combined state is neither "un-failing" nor "offline", at block 912, the storage system 100 determines that it is not ok to provision the partitions from the disk, and the process returns at block 914.

Figure 10A:
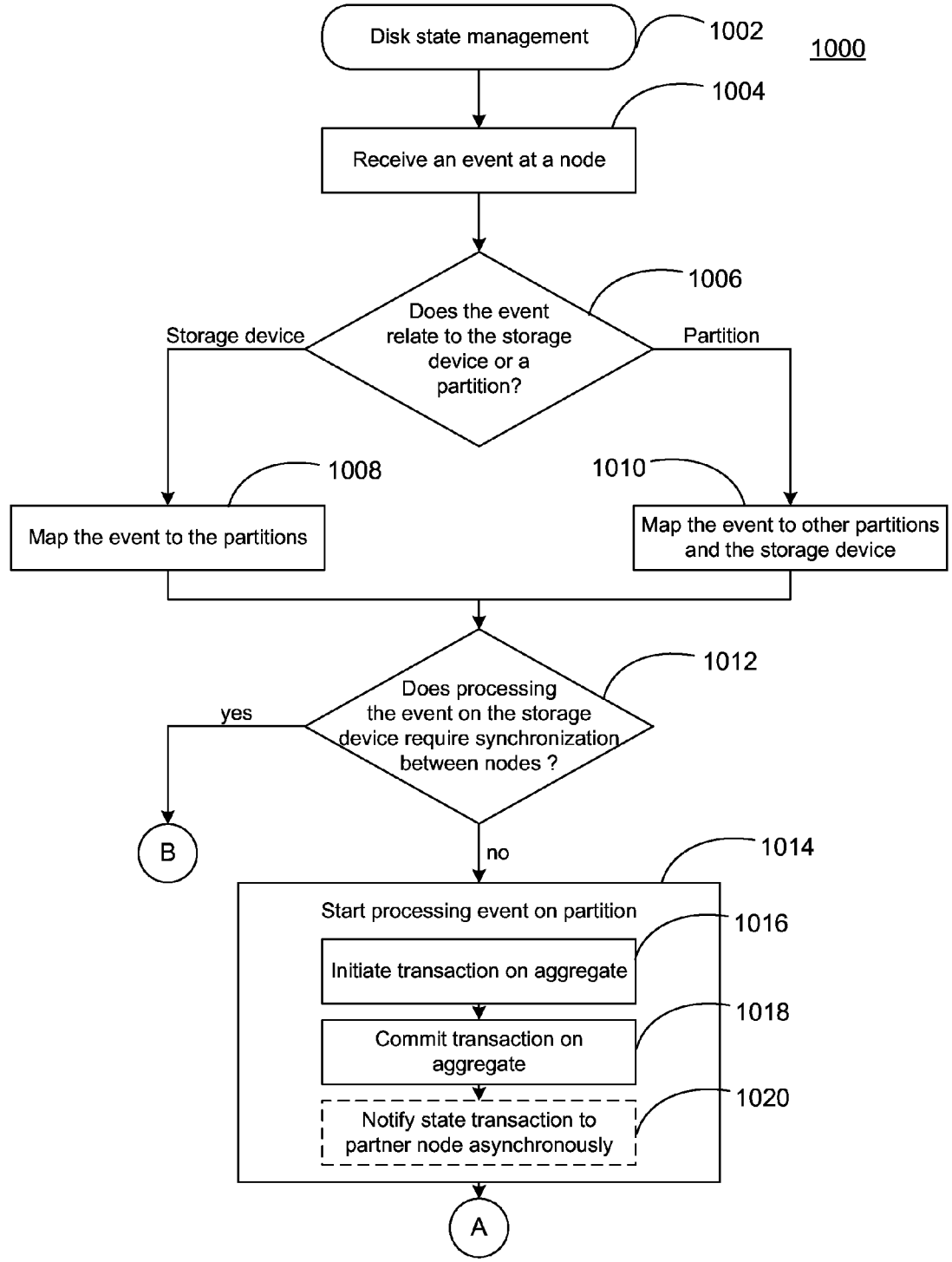
FIGS. 10A and 10B are flow diagrams illustrating a process for managing a state of a container disk in a shared storage system, consistent with various embodiments.
Figure 10B:
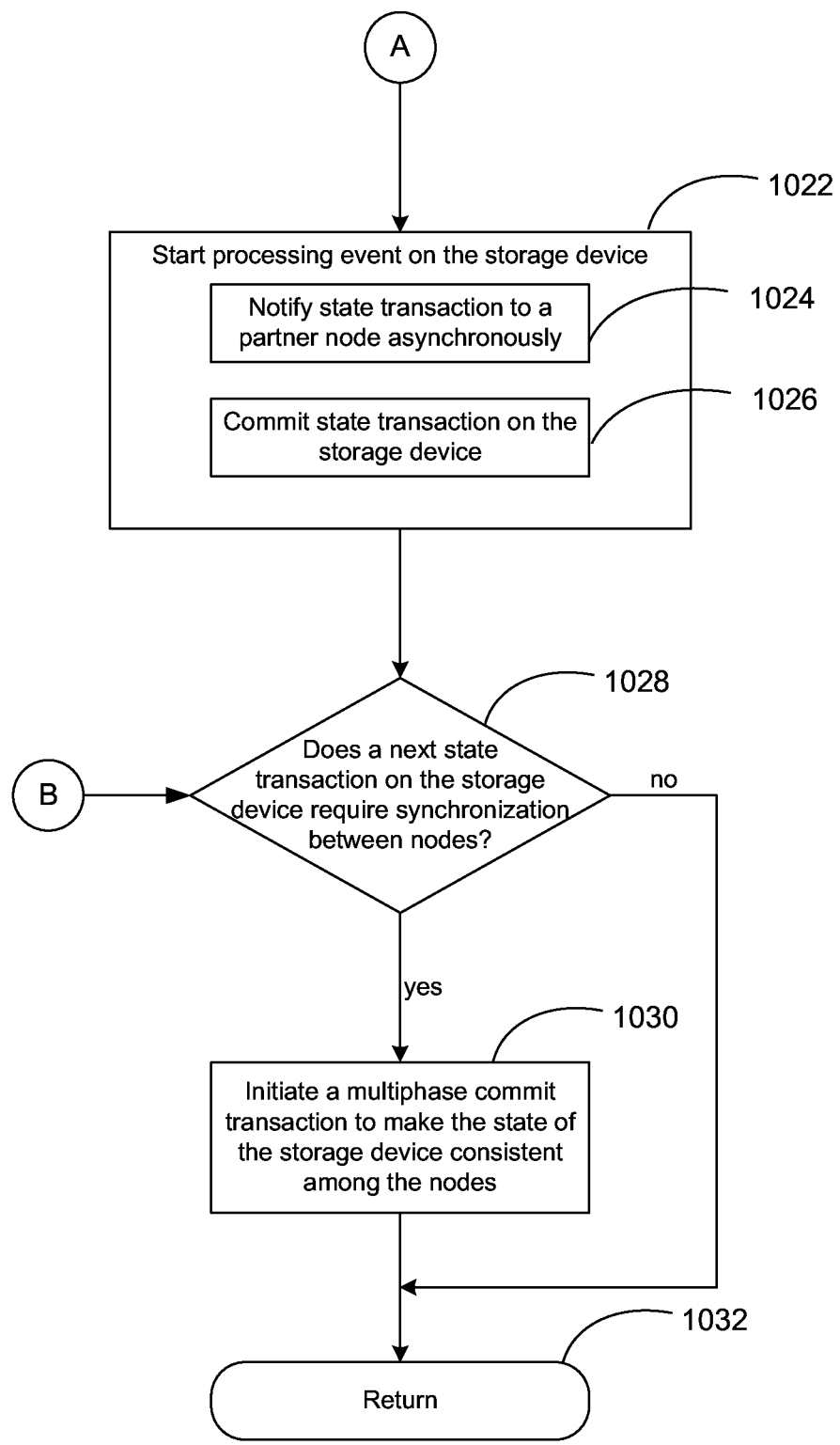

FIGS. 10A and 10B are flow diagrams illustrating a process 1000 for managing a state of a container disk in a shared storage system, consistent with various embodiments. The process 1000 may execute in a shared storage system, e.g., the shared storage system 100 of FIG. 1 and begins at block 1002. At block 1004, a node, e.g., node 101*a*, receives an event. At decision block 1006, the node 101*a* determines whether the received event occurred at a shared storage device, e.g., the container disk 108, or on a partition of the container disk 108.

Responsive to a determination that the event relates to the container disk 108, at block 1008, the node 101*a* maps the event to partitions in the container disk. On the other hand, responsive to a determination that the event relates to a partition of the container disk 108, at block 1010, the node 101*a* maps the event to the container disk 108 and to the other partitions in the container disk 108.

At decision block 1012, the node 101*a* determines whether a processing of the event requires synchronization (or distributed co-ordination) between the nodes e.g., nodes 101*a* and 101*b*, of the shared storage system. In embodiments having more than two nodes, it is determined whether the synchronization is required between at least a subset of all the nodes.

Responsive to a determination that a synchronization between the nodes 101*a-b* is required to process the event, the control is transferred to block 1028, described below. On the other hand, responsive to a determination that a synchronization between the nodes 101*a-b* is not required to process the event, at block 1014, the node starts processing the event. In some embodiments, processing the event can include initiating a transaction associated with the event on an aggregate containing the partition (block 1016), and committing the transaction on the aggregate (block 1018). In an embodiment, an aggregate typically comprises one or more RAID groups of disks or partitions.

Because the partition is owned by a particular node, the state change of a particular partition is local to the node that owns the partition. Nodes typically do not require information regarding the state change of the partition that is not owned by them. However, in embodiments where a node may want to have information regarding a state of the partition owned by other nodes, the node may be informed using asynchronous state notifications. That is, after committing the transaction (block 1018), the node 101*a* can optionally transmit the change of state (resulting from executing the transaction associated with the event) of the partition to the partner node 101b (block 1020). The transmission of the state change can be asynchronous. The execution then proceeds with block 1022.

At block 1022, the node 101a processes the event on the container disk 108a. In some embodiments, processing the event on the container disk 108 includes processing a transaction associated with the event, committing the transaction relative to container disk 108 (block 1024), and notifying a change in the state of the container disk 108 to the partner nodes (block 1026).

At decision block 1028, the node 101a determines whether a next state transaction on the container disk 108 requires a synchronization between the nodes. Responsive to a determination that a synchronization is required between the nodes 101a-b to process the next state transaction, at block 1030, the node 101a initiates a multi-phase commit transaction to successfully execute the next state transaction. On the other hand, responsive to a determination that a synchronization is not required between the nodes 101a-b to process the next state transaction, the process 1000 returns at block 1032.

Referring back to block 1030, the multi-phase commit transaction can include known distributed algorithms, e.g., a two-phase or a three-phase commit protocols. The two-phase commit protocol (2PC) is a type of atomic commitment protocol (ACP). It is a distributed algorithm that coordinates all the processes that participate in a distributed atomic transaction on whether to commit or abort the transaction. It is a specialized type of consensus protocol. The 2PC includes a commit-request phase (voting phase) and a commit phase (completion phase). In the commit-request phase, a coordinator node attempts to prepare all the transaction's partner nodes to take the necessary steps for either committing or aborting the transaction and to vote, either "Yes": commit, if the transaction participant's local portion execution has ended properly, or "No": abort, if a problem has been detected with the local portion. In the commit phase, based on voting of the participating nodes, the coordinator node decides whether to commit or abort the transaction, and notifies the result to all the partner nodes. The partner then follow with the actions (e.g., commit or abort) with their local transactional resources and their respective portions in the transaction's other output (if applicable).

A three-phase commit protocol (3PC), like 2PC, is a distributed algorithm that enables all nodes in a distributed system to agree to commit a transaction. However, unlike the 2PC, 3PC is non-blocking. Specifically, 3PC places an upper bound on the amount of time required before a transaction either commits or aborts. This property ensures that if a given transaction is attempting to commit via 3PC and holds some resource locks, it will release the locks after the timeout.

State Management Example—Firmware Upgrade of a Container Disk

The following paragraph describes the state management process for a task that requires synchronization between nodes, e.g., a firmware upgrade. Referring to the flow depicted by flow diagrams of FIGS. 10A and 10B, the node 101a receives the firmware upgrade event (block 1004). The node 101a determines that the event relates to the container disk 108 (decision block 1006) and maps the event to the partitions in the container disk 108 (block 1008). The node 101a determines that the firmware upgrade event requires synchronization between nodes to first offline all partitions and the container disk instance on each node (decision block 1012, yes). Then, the node determines that a next state transaction requires synchronization between nodes (decision block 1028, yes). The node 101a processes the firmware upgrade event on the container disk 108 (step 1030) using 2PC or 3 PC.

Shared Storage Architecture—Implementation Scenarios

A high-availability (HA) storage system typically includes multiple (at least two) nodes that provide storage services to a client. The HA storage system includes one or more storage devices that store data for use by the client. The requests from the clients are routed to one of the nodes, and the node that receives the request services the request. The HA storage system can be configured in various ways to provide storage services to the client.

Figure 11:
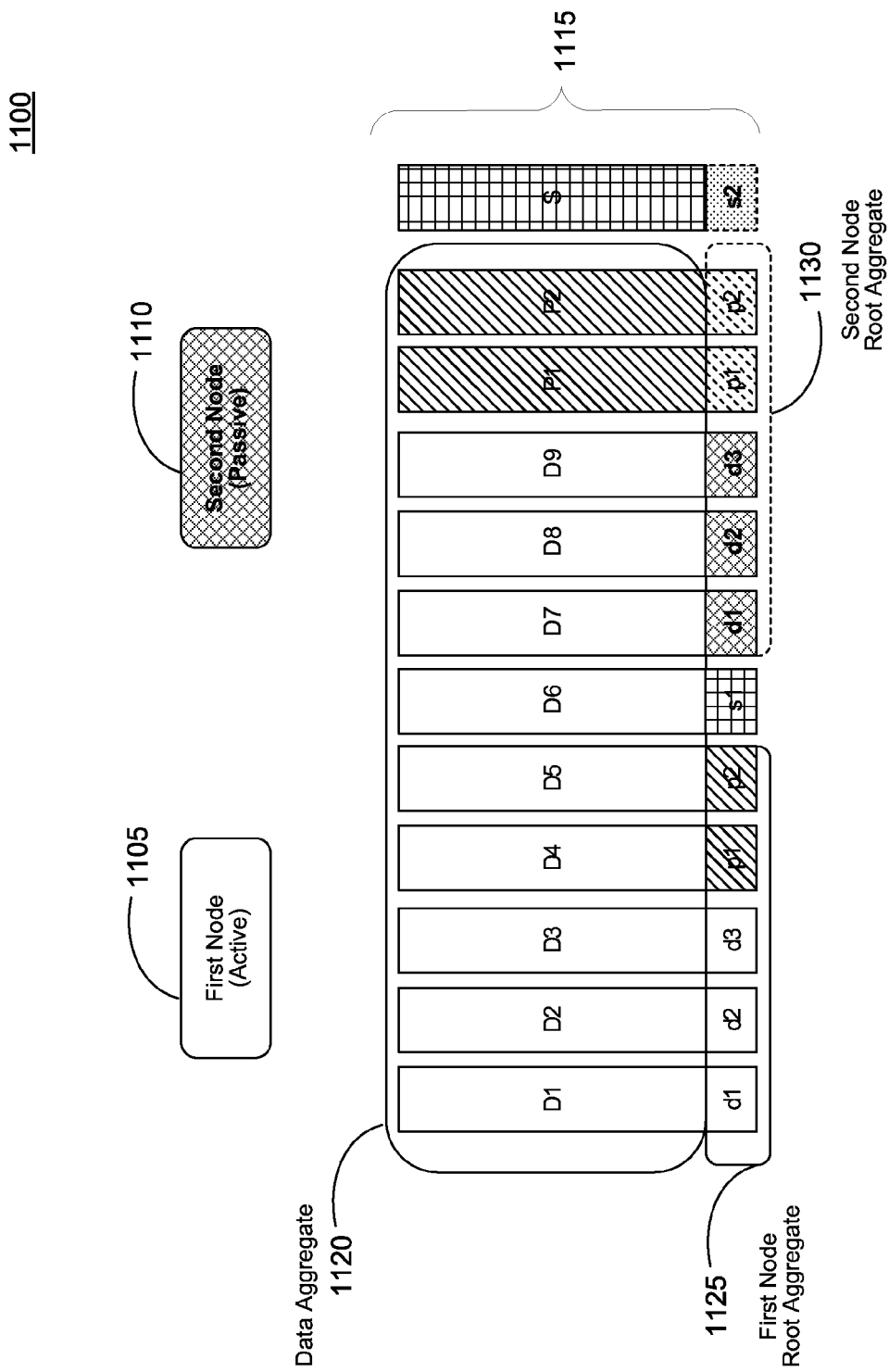
FIG. 11 is a block diagram illustrating an implementation of a highly available (HA) storage system in an active-passive mode using the shared storage architecture, consistent with various embodiments.

FIG. 11 is a block diagram illustrating an implementation of a highly available (HA) storage system 1100 in an active-passive mode using the shared storage architecture, consistent with various embodiments. In the active-passive mode configuration, typically one node is an active node and another node is a passive node. The active node serves the requests from the client and the passive node, which is typically in a stand-by mode, assumes the role of an active node when, for example, the active node fails. The HA storage system 1100 includes two nodes, namely, a first node 1105 and a second node 1110 that provide access to storage device 1115. The first node 1105 is an active node and the second node 1110 is a passive node.

The shared storage architecture enables the storage device 1115 to be shared between the first node 1105 and the second node 1110. One or more storage disks of the storage device 1115 are partitioned and the partitions are shared between the nodes. For example, each of the twelve (12) disks of the illustrated storage device 1115, namely, storage disks D1-D9, parity disks P1 and P2, and spare disk "S," are partitioned into two different partitions that are shared between the first node 1105 and the second node 1110. A first partition from each of the disks is collectively configured into a data aggregate 1120 to store data, e.g., data received from a client of the HA storage system 1100. A second partition from disks D1-D5 is collectively used as a root aggregate 1125 for the first node 1105, and a second partition from disks D7-D9 and P1-P2 is collectively used as a root aggregate 1130 for the second node. A root aggregate includes data such as configuration data, initialization data, etc., of a node that may be usable to initialize or boot the node.

In the active-passive configuration, typically only the active node has a data aggregate. However, both the active and passive nodes have their corresponding root aggregates. In the HA storage system 1100, the data aggregate 1120 is associated with the first node 1105, meaning only the first node 1105 is authorized to read from or write to the data aggregate 1120.

In some embodiments, because the shared storage architecture enables the disk to be shared across different nodes, a need for having separate disks for different nodes is eliminated. For example, in a non-shared storage architecture, the active-passive configuration of the HA storage system would typically require two disks for each of the nodes for their corresponding root aggregates, two disks for parity, and a spare disk. This would result in only five (5) out of twelve (12) disks (in a 12 disk configuration) being available for use as a data aggregate. However, with the above shared storage architecture, nine (9) out of 12 disks are available for use as the data aggregate. That is, the shared storage architecture makes available four (4) additional disks for use as the data aggregate. Thus, the shared storage architecture provides the benefit of additional storage space for a data aggregate and provides an increased efficiency in the management of the storage device.

Further, in some embodiments, to maximize the disk space available for the data aggregate, each of the disks D1-D9, P1, P2 and S may be partitioned to create a partition having a size that is just enough for storing root aggregate data. For example, one or two percent of each disk may allocated to a root aggregate. This way, the available disk space may be maximized for the data aggregate.

Figure 12:
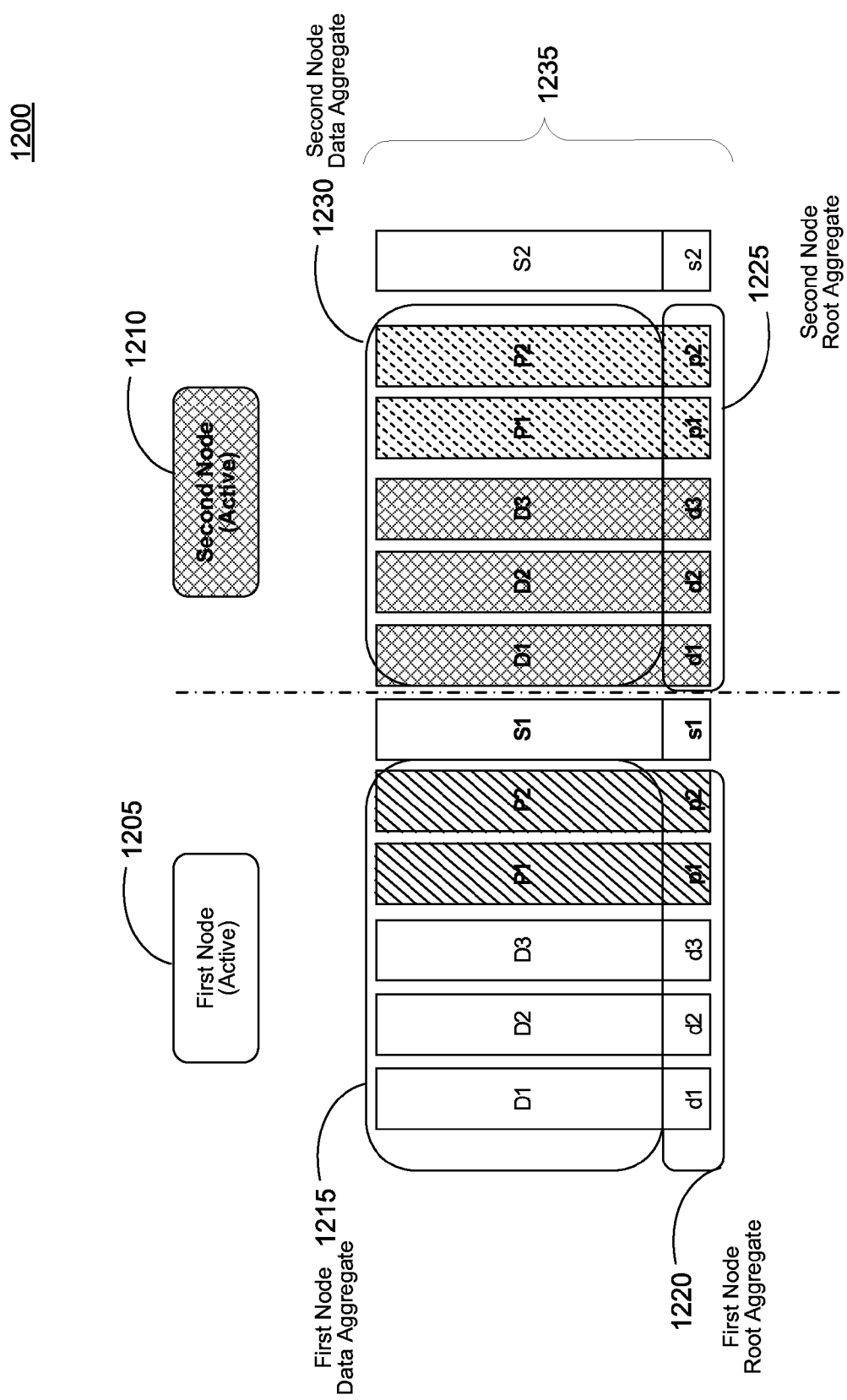
FIG. 12 is a block diagram illustrating an implementation of a HA storage system in an active-active mode using the shared storage architecture, consistent with various embodiments.

FIG. 12 is a block diagram illustrating an implementation of a HA storage system 1200 in an active-active mode using the shared storage architecture, consistent with various embodiments. In the active-active mode configuration, typically both the nodes, first node 1205 and second node 1210 are active nodes. That is, both the nodes can serve requests from clients, and read from and write to the storage device 1235. However, a client request can be routed to one of the nodes based on various criteria.

Since both the nodes are active nodes, unlike the active-passive configuration of FIG. 11, the nodes have a corresponding data aggregate which they can write data into or read data from. For example, the first node 1205 has a first node data aggregate 1215 associated with it, and the second node 1210 has a second node data aggregate 1230 associated with it. Further, like the active-passive configuration, each of the nodes has a corresponding root aggregate. For example, the first node 1205 has a first node root aggregate 1220 associated with it, and the second node 1210 has a second node root aggregate 1225 associated with it. Though the HA storage system 1200 does not illustrate sharing of a disk of the storage device 1235 between the first node 1205 and the second node 1210, the disks in the storage device 1235 are not limited to such an embodiment. The disks of the storage device 1235 can be partitioned and different partitions can be part of different data aggregates.

Figure 13:
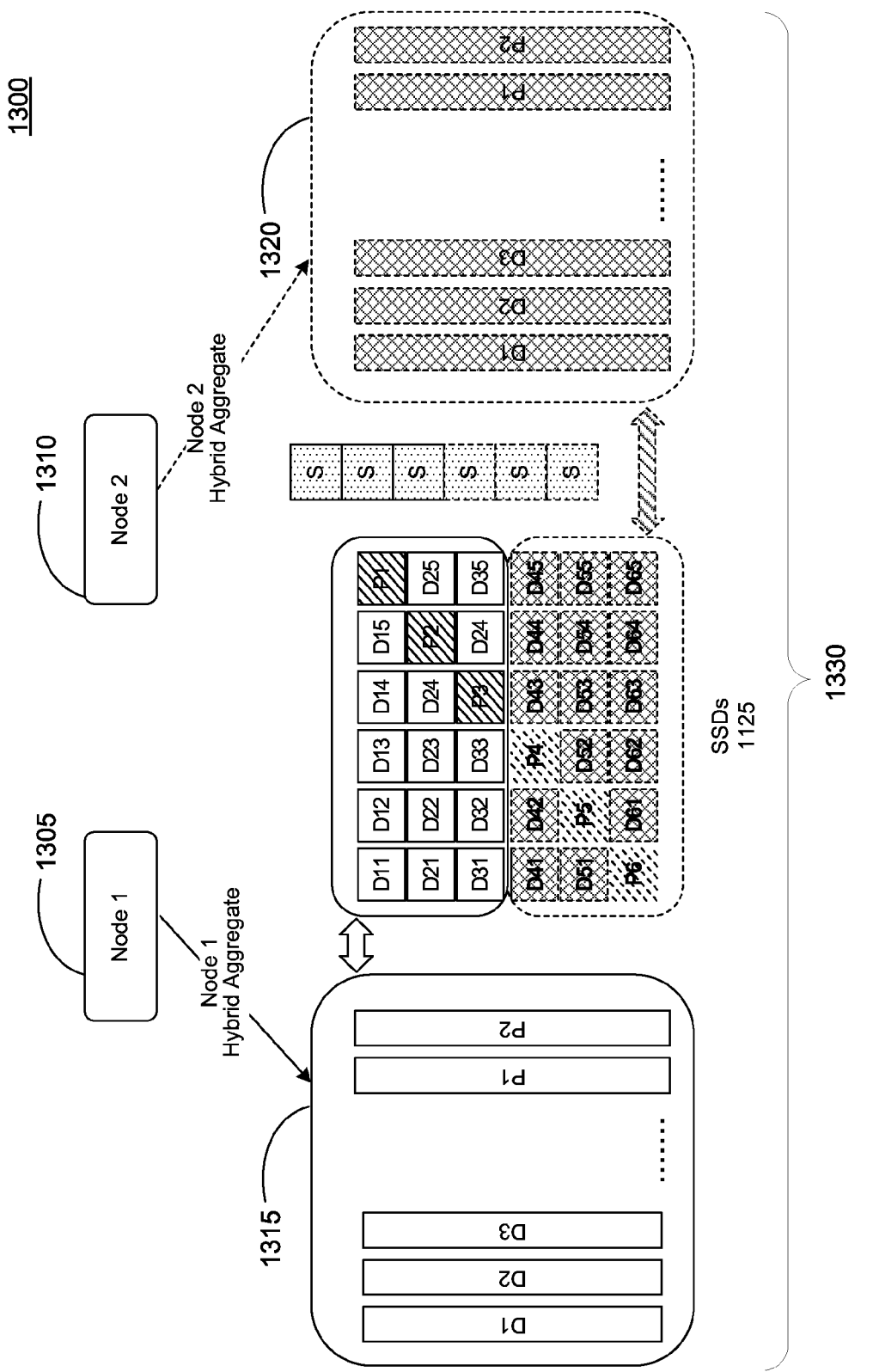
FIG. 13 is a block diagram illustrating an implementation of a HA storage system using the shared storage architecture having a hybrid data aggregate, consistent with various embodiments.

FIG. 13 is a block diagram illustrating an implementation of a HA storage system 1300 using the shared storage architecture having a hybrid data aggregate, consistent with various embodiments. The storage device 1330 of the HA storage system 1300 includes solid state device (SSD) 1325 based storage, e.g., a flash pool. In this embodiment, the data aggregate of a node can be a hybrid of a non-SSD storage, e.g., a hard disk drive and flash tier. Further, the flash pool can be partitioned and partitions can be shared across different nodes as illustrated in FIG. 13. As illustrated in FIG. 13, the collection of SSDs 1325 is partitioned into several partitions, and the partitions are shared across two different aggregates and two different nodes. The first node 1305 has a hybrid data aggregate that includes non-SSD storage 1315 and a portion of the flash pool 1325. The second node 1310 has a hybrid data aggregate that includes non-SSD storage 1320 and a portion of the flash pool 1325. The non-SSD storage 1315 and/or 1320 may further be partitioned or non-partitioned.

Computer System Overview

Figure 14:
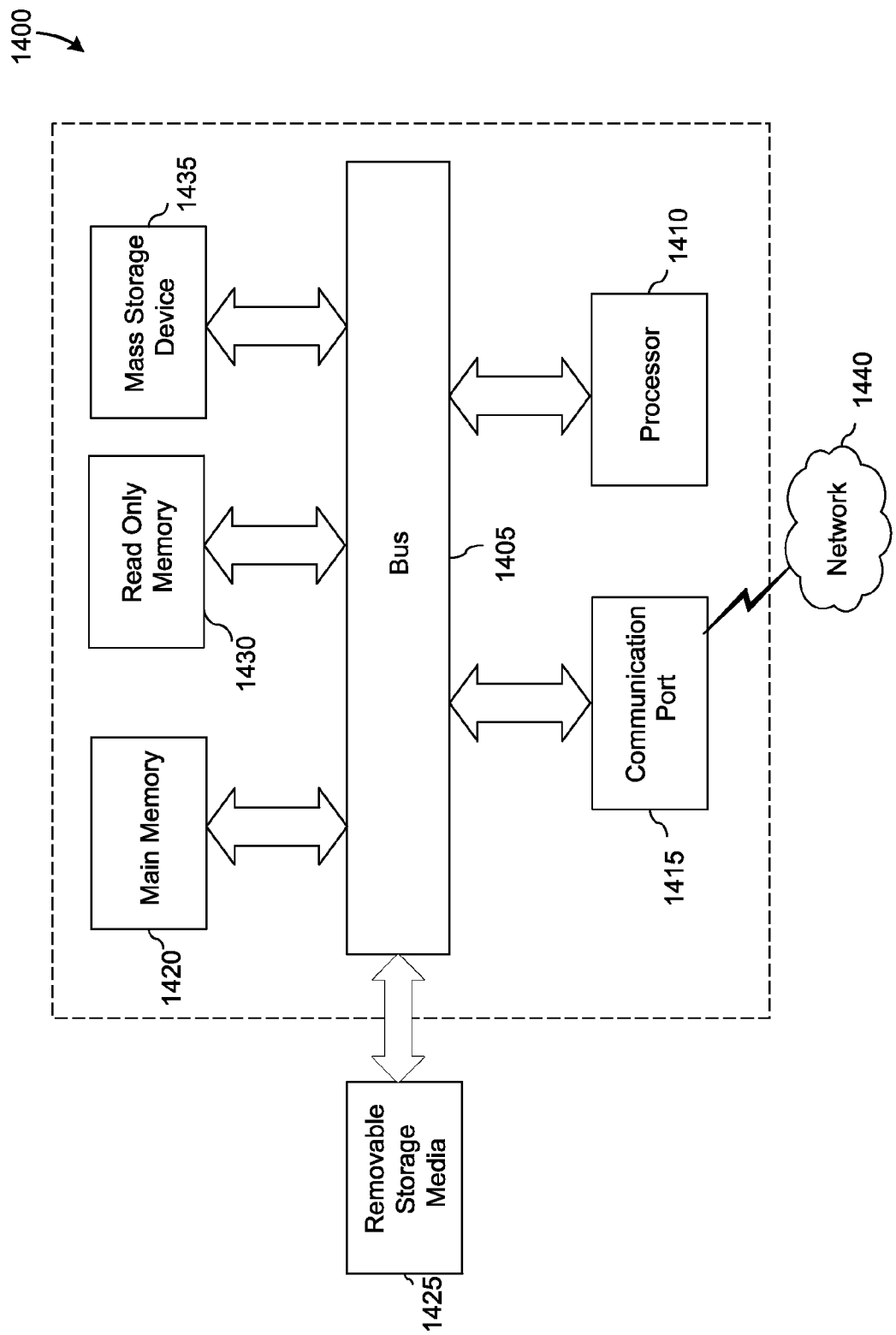
FIG. 14 is a block diagram of a computer system as may be used to implement features of some embodiments of the disclosed technology.

Various embodiments include various steps and operations, which have been described above. A variety of these steps and operations may be performed by hardware components or may be embodied in machine-executable instructions, which may be used to cause a general-purpose or special-purpose processor programmed with the instructions to perform the steps. Alternatively, the steps may be performed by a combination of hardware, software, and/or firmware. FIG. 14 is a block diagram of a computer system as may be used to implement features of some embodiments of the disclosed technology. Various of the disclosed features may be associated with a computer system 1400. According to the present example, the computer system includes a bus 1405, at least one processor 1410, at least one communication port 1415, a main memory 1420, a removable storage media 1425, a read only memory 1430, and a mass storage 1435.

Processor(s) 1410 can be any known processor, such as, but not limited to, an Intel® Itanium® or Itanium 2® processor(s), or AMD® Opteron® or Athlon MP® processor(s), or Motorola® lines of processors. Communication port(s) 1415 can be any of an RS-232 port for use with a modem based dialup connection, a 10/100 Ethernet port, or a Gigabit port using copper or fiber. Communication port(s) 1415 may be chosen depending on a network such a Local Area Network (LAN), Wide Area Network (WAN), or any network to which the computer system 1400 connects.

Main memory 1420 can be Random Access Memory (RAM), or any other dynamic storage device(s) commonly known in the art. Read only memory 1430 can be any static storage device(s) such as Programmable Read Only Memory (PROM) chips for storing static information such as instructions for processor 1410.

Mass storage 1435 can be used to store information and instructions. For example, hard disks such as the Adaptec® family of SCSI drives, an optical disc, an array of disks such as RAID, such as the Adaptec family of RAID drives, or any other mass storage devices may be used.

Bus 1405 communicatively couples processor(s) 1410 with the other memory, storage and communication blocks. Bus 1405 can be a PCI/PCI-X or SCSI based system bus depending on the storage devices used.

Removable storage media 1425 can be any kind of external hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM).

The components described above are meant to exemplify some types of possibilities. In no way should the aforementioned examples limit the scope of the invention, as they are only exemplary embodiments.

Remarks

The above description and drawings are illustrative and are not to be construed as limiting. Numerous specific details are described to provide a thorough understanding of the disclosure. However, in certain instances, well-known details are not described in order to avoid obscuring the description. References to one or an embodiment in the present disclosure can be, but not necessarily are, references to the same embodiment; and, such references mean at least one of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way. One will recognize that "memory" is one form of a "storage" and that the terms may on occasion be used interchangeably.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any term discussed herein is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given above. Note that titles or subtitles are used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. Accordingly, the invention is not limited except as by the appended claims.

While the computer-readable medium is shown in an embodiment to be a single medium, the term "computer-readable medium" should be taken to include a single medium or multiple media (e.g., a centralized or distributed database, and/or associated caches and servers) that stores the one or more sets of instructions. The term "computer-readable medium" may also be taken to include any medium that is capable of storing, encoding or carrying a set of instructions for execution by the computer and that cause the computer to perform any one or more of the methodologies of the presently disclosed technique and innovation.

In general, the routines executed to implement the embodiments of the disclosure, may be implemented as part of an operating system or a specific application, component, program, object, module or sequence of instructions referred to as "programs." The programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and computer systems, various embodiments are capable of being distributed as a program product in a variety of forms, and that the disclosure applies equally regardless of the particular type of computer-readable medium used to actually effect the distribution.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all the following interpretations of the word: any of the items in the list, all of the items in the list, and any combination of the items in the list.

The above detailed description of embodiments of the disclosure is not intended to be exhaustive or to limit the teachings to the precise form disclosed above. While specific embodiments of, and examples for the disclosure, are described above for illustrative purposes, various equivalent modifications are possible within the scope of the disclosure, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or sub-combinations. Each of these processes or blocks may be implemented in a variety of different ways. Also, while processes or blocks are at times shown as being performed in series, these processes or blocks may instead be performed in parallel, or may be performed at different times. Further any specific numbers noted herein are only examples: alternative implementations may employ differing values or ranges.

The teaching of the disclosure provided herein can be applied to other systems, not necessarily the system described above. The elements and acts of the various embodiments described above can be combined to provide further embodiments.

Aspects of the disclosure can be modified, if necessary, to employ the systems, functions, and concepts of the various references described above to provide yet further embodiments of the disclosure. For example, although various steps have been discussed in certain of the flow diagrams, one will recognize that additional steps may be performed or depicted steps omitted to accomplish similar functionality. In some instances optional elements may be indicated by dashed outlines in the flow diagrams, whereas in other elements the optionality may be explicitly stated in the text. One will recognize that many process steps not explicitly indicated as being optional may also be optional depending upon the context. The illustrated example flow diagrams are provided for purposes of explanation rather than as limiting depiction of one or more embodiments. Accordingly the depicted steps are illustrative.

These and other changes can be made to the disclosure in light of the above Detailed Description. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limited the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

What is claimed is:

1. A shared storage system, comprising:
a storage device logically divided into a plurality of partitions; and
multiple computer systems sharing access to the storage device, wherein (1) at least some of the plurality of partitions are associated with an owner computer system, (2) write access to user data stored on the partitions is restricted to the owner computer system of the partition, and (3) owner computer systems of at least two partitions are different, wherein each of the multiple computer systems stores a state of the storage device, thereby creating multiple states of the storage device.

2. The shared storage system of claim 1, wherein each of the partitions includes information regarding the owner computer system of the partition.

3. The shared storage system of claim 1, wherein the computer systems communicate with each other via a cluster interconnection layer.

4. The shared storage system of claim 1, further comprising:
a reservation module to, on detection of a failing computer system, transfer write access to partitions owned by the failing computer system to a different computer system of the multiple computer systems.

5. The shared storage system of claim 4, wherein the reservation module prevents a current write operation by the failing computer system on a partition owned by the failing computer system from completing.

6. The shared storage system of claim 1, wherein at least some of the multiple computer systems asynchronously share the state with other computer systems of the multiple computer systems.

7. The shared storage system of claim 6, wherein the states from the multiple computer systems are combined to derive a single shared state of the storage device.

8. The shared storage system of claim 1, wherein the storage device includes at least one of a non-volatile solid state drive or a disk drive.

9. The shared storage system of claim 1, wherein each of the plurality of partitions has a logical zoning structure identical to that of a non-partitioned storage device, the logical zoning structure including information regarding organization of data in the partition.

10. A computer-implemented method, comprising:
partitioning, in a shared storage system having multiple computer systems, a storage device into multiple partitions;
storing, by each of the multiple computer systems, a state of the storage device to generate multiple states of the storage device;
associating, by the shared storage system, at least some of the partitions with an owner computer system, wherein owner computer systems of at least two partitions are different; and
restricting, by the shared storage system, write access to user data stored on the partitions to the owner computer system.

11. The method of claim 10 further comprising:
storing, in the partitions, information regarding an owner computer system of the partition.

12. The method of claim 10 further comprising:
reserving for a different computer system, write access to partitions owned by the failing computer system on detection of a failing computer system; and
preventing the failing computer system from completing a current write operation to a partition owned by the failing computer system.

13. The method of claim 10, further comprising:
sharing, by each of the computer systems, the state of the storage device with other computer systems; and
deriving a single shared state of the storage device as a function of the states from the computer systems.

14. The method of claim 10, further comprising:
receiving, at a first computer system, an event;
determining whether processing the event on the storage device requires a synchronization between the computer systems;
responsive to a determination that the event requires a synchronization between the computer systems, determining whether a next state transaction for the storage device requires synchronization between the computer systems;
responsive to a determination that the next state transaction for the storage device requires synchronization, initiating a multi-phase commit action between the computer systems; and
processing the event on the storage device.

15. The method of claim 14 further comprising:
responsive to a determination that processing the event on the storage device does not require synchronization between the computer systems,
processing, by the first computer system, the event on a partition associated with the first computer system,
processing, by the first computer system, the event on the storage device,
performing a commit of a state transaction on the storage device, and notifying the state transaction of the storage device to other computer systems asynchronously.

16. The method of claim 14, wherein receiving an event at a first computer system further includes:
determining whether the event is received on the storage device or a partition associated with the first computer system;
responsive to a determination that the event is received on the storage device, mapping the event to the partitions of the storage device; and
responsive to a determination that the event is received on the partition, mapping the event to the storage device and other partitions of the storage device.

17. The method of claim 10, wherein each of the partitions has a logical zoning structure similar to that of a non-partitioned storage device, the logical zoning structure including information regarding organization of data in the partition.

18. A computer storage system, comprising:
a first node;
a second node in communication with the first node; and
a shared storage system having a first storage device and a second storage device, each of the first storage device and the second storage device including a first partition and a second partition, wherein:
the first partition of at least one of the first storage device or the second storage device is associated with the first node,
the second partition of the first storage device is associated with the first node,
the second partition of the second storage device is associated with the second node, wherein access to a partition is restricted to a node with which the partition is associated,
the first partition of both the first storage device and the second storage device stores user data received from a client of the computer storage system,
the second partition of the first storage device stores control data of the first node for initializing the first node, and
the second partition of the second storage device stores control data of the second node for initializing the second node.

19. The computer storage system of claim 18, wherein the first node is an active node that services a storage request from the client by accessing the first partition of at least one of the first storage device and the second storage device.

20. The computer storage system of claim 18, wherein the first partition of the first storage device is associated with the first node and the first partition of the second storage device is associated with the second node, and wherein
the first node and the second node are active nodes servicing storage requests from the client, the first node servicing a storage request by accessing the first partition of the first storage device, and the second node servicing another storage request by accessing the first partition of the second storage device.

21. The computer storage system of claim 18, wherein
the shared storage system includes a third storage device, the third storage device including a plurality of partitions, each of the partitions storing the user data of the client, and wherein at least one partition associated with the first node and at least one partition is associated with the second node.

22. The computer storage system of claim 21, wherein the third storage device includes a non-volatile solid state memory.

23. The computer storage system of claim 18 further comprising:
a reservation module to reserve, on detection of a failure of the first node, write access to the first storage device and the second storage device to the second node and prevent a current write operation on the first partition by the first node from completing.

24. The computer storage system of claim 18, wherein the first node communicates with the second node via a cluster interconnection layer.

* * * * *